(12) United States Patent
Oishi et al.

(10) Patent No.: US 7,816,045 B2
(45) Date of Patent: Oct. 19, 2010

(54) FUEL CELL SYSTEM AND CONTROL METHOD THEREFOR

(75) Inventors: Masatsugu Oishi, Miyagi (JP); Yasuyuki Muramatsu, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 780 days.

(21) Appl. No.: 10/599,632

(22) PCT Filed: Apr. 4, 2005

(86) PCT No.: PCT/JP2005/006978

§ 371 (c)(1),
(2), (4) Date: Jun. 15, 2007

(87) PCT Pub. No.: WO2005/099015

PCT Pub. Date: Oct. 20, 2005

(65) Prior Publication Data

US 2007/0259227 A1  Nov. 8, 2007

(30) Foreign Application Priority Data

Apr. 7, 2004 (JP) ............................. 2004-113161
Apr. 28, 2004 (JP) ............................. 2004-134012

(51) Int. Cl.
H01M 8/00 (2006.01)
H01M 8/04 (2006.01)
H01M 10/48 (2006.01)
H01M 16/00 (2006.01)

(52) U.S. Cl. ........................... 429/428; 429/61; 429/90; 429/50; 429/502; 429/91; 429/429; 700/296; 700/299

(58) Field of Classification Search .................. 429/9, 429/13, 22–24, 30, 92; 700/296, 299; H01M 8/04, H01M 10/48, 16/00
See application file for complete search history.

(56) References Cited

U.S. PATENT DOCUMENTS

2002/0025465 A1  2/2002  Christen et al.

(Continued)

FOREIGN PATENT DOCUMENTS

JP  2002-231290 A  8/2002

(Continued)

OTHER PUBLICATIONS

Official Communication issued in the corresponding International Application No. PCT/JP2005/006978, mailed on Aug. 16, 2006.

(Continued)

Primary Examiner—Melvin C Mayes
Assistant Examiner—Jun Li
(74) Attorney, Agent, or Firm—Keating & Bennett, LLP

(57) ABSTRACT

A fuel cell system including a fuel cell stack is capable of raising the temperature of a fuel cell stack to a predetermined temperature within a short time without decreasing methanol fuel utilization efficiency. During system startup, the concentration of methanol aqueous solution which is to be supplied to the fuel cell stack is detected by a concentration sensor, and the temperature of the fuel cell stack is detected by a temperature sensor. A target concentration of methanol aqueous solution is determined by making reference to data stored in a memory, which indicates correspondence between the temperature of the fuel cell stack and the target concentration of methanol aqueous solution, and based on the temperature of the fuel cell stack detected by the temperature sensor.

14 Claims, 17 Drawing Sheets

U.S. PATENT DOCUMENTS

| | | |
|---|---|---|
| 2002/0076585 A1 | 6/2002 | Mund |
| 2003/0003336 A1 | 1/2003 | Colbow et al. |
| 2003/0039870 A1 | 2/2003 | Busenbender |
| 2003/0180583 A1* | 9/2003 | Ichikawa et al. ............... 429/9 |
| 2004/0054483 A1 | 3/2004 | Gopal et al. |

FOREIGN PATENT DOCUMENTS

| | | |
|---|---|---|
| JP | 2002-543567 A | 12/2002 |
| JP | 2004-095376 A | 3/2004 |

OTHER PUBLICATIONS

Narayanan et al.; "Design and Operation of an Electrochemical Methanol Concentration Sensor for Direct Methanol Fuel Cell Systems"; Electrochemical and Solid-State Letters; 3 (3); pp. 117-120; 2000.

Nomura; "Technical Trend in Portable-Type Fuel Cell Stack"; OHM General Engineering Magazine; vol. 90, Issue 7; pp. 34-38; Jul. 2003.

Official communication issued in the corresponding International Application No. PCT/JP2005/006978, mailed on Oct. 27, 2006.

Muramatsu, "Fuel Cell System", U.S. Appl. No. 12/107,792, filed Apr. 23, 2008.

* cited by examiner

FIG. 3

| Cell stack temperature | 5°C> | 5°C≦ 15°C> | 15°C≦ 25°C> | 25°C≦ |
|---|---|---|---|---|
| Target concentration | 10wt% | 8wt% | 6wt% | 5wt% |

(a)

| Target temperature raise time \ Cell stack temperature | 5°C > | 5°C ≦ 15°C > | 15°C ≦ 25°C > | 25°C ≦ |
|---|---|---|---|---|
| 5 minutes | 16wt% | 14wt% | 10wt% | 6wt% |
| 15 minutes | 10wt% | 8wt% | 6wt% | 4wt% |
| 30 minutes | 8wt% | 6wt% | 5wt% | 4wt% |

(b)

(a)

| Amount of Charge in Secondary Battery | 10%≦ 25%> | 25%≦ 50%> | 50%≦ |
|---|---|---|---|
| Target temperature raise time | 5 minutes | 15 minutes | 30 minutes |

(b)

(c)

| Amount of Charge in Secondary Battery \ Cell stack temperature | 5°C> | 5°C≦ 15°C> | 15°C≦ 25°C> | 25°C≦ |
|---|---|---|---|---|
| 10%≦ 25%> | 16wt% | 14wt% | 10wt% | 6wt% |
| 25%≦ 50%> | 10wt% | 8wt% | 6wt% | 4wt% |
| 50%≦ | 8wt% | 6wt% | 5wt% | 4wt% |

| Temperature Difference between Cell stack and Ambient Temperature | 0°C ≦ 10°C > | 10°C ≦ 20°C > | 20°C ≦ 30°C > | 30°C ≦ |
|---|---|---|---|---|
| Amount of Correction | 10cc | 15cc | 20cc | 25cc |

(b)

| Amount of Charge in Secondary Battery | 0% ≦ 10% > | 10% ≦ 25% > | 25% ≦ 50% > | 50% ≦ |
|---|---|---|---|---|
| Target Concentration | Do not start system | 16wt% | 10wt% | 8wt% |

F I G. 1 0

Target Concentration: 6wt%

| Concentration of Methanol Aqueous Solution at the end of generation | 0wt%≦ 2wt%> | 2wt%≦ 4wt%> | 4wt%≦ 6wt%> | 6wt%≦ |
|---|---|---|---|---|
| Amount of Methanol Fuel Input | 200cc | 160cc | 120cc | 100cc |

F I G. 1 2

| Ambient Temperature | 0°C≦ 10°C> | 10°C≦ 20°C> | 20°C≦ 30°C> | 30°C≦ 40°C> | 40°C≦ |
|---|---|---|---|---|---|
| Target Concentration | 8wt% | 7wt% | 6wt% | 5wt% | 4wt% |

FIG. 13

| Temperature Range (°C) | Temperature Raise Reference Gradient (°C/min) | Amount of Fuel Input (cc) |
|---|---|---|
| 60 – 65 | 0.5 | 3 |
| 50 – 60 | 1.0 | 4 |
| 40 – 50 | 1.5 | 6 |
| 30 – 40 | 2.0 | 8 |
| 20 – 30 | 2.5 | 10 |
| 0 – 20 | 3.0 | 12 |

F I G. 1 5
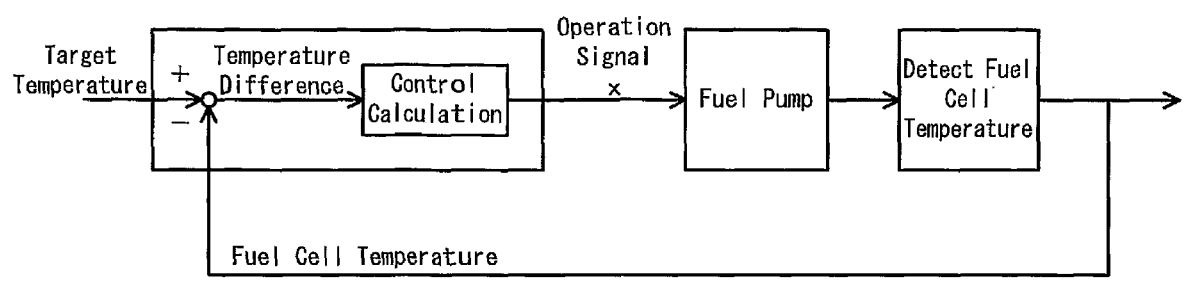

FUEL CELL SYSTEM AND CONTROL METHOD THEREFOR

BACKGROUND OF THE INVENTION

1. Field of the Invention

The present invention relates to a fuel cell system and a control method therefor. More specifically, the present invention relates to a portable-type direct-methanol fuel cell system (DMFC: Direct Methanol Fuel Cell) and a control method therefor.

2. Description of the Related Art

When starting a direct methanol fuel cell system, which uses a methanol aqueous solution as a fuel without depending upon a reformer, under a normal ambient temperature, it is desirable that the fuel cell stack is brought to a predetermined temperature (approximately 65° C. at which an appropriate amount of power can be generated within a short period of time. As a proposed solution described in OHM General Engineering Magazine, July 2003 issue, Contents, Volume 90, issue 7: Technical Trend in Portable-Type Fuel Cell Stack; by Eichi Nomura, Yuasa Corporation, hereinafter referred to as Non-Patent Document 1, for example, discloses a technique of increasing the temperature by supplying the fuel cell stack with a thick methanol aqueous solution at the startup in order to promote a crossover in the fuel cell stack. Heat generated by the crossover and heat generated by the power generating reaction combine to accelerate the temperature increase. When the fuel cell stack is supplied with the thick methanol aqueous solution, methanol crossover increases, and the heat generating reaction on the cathode side increases, thereby enabling a reduction in the amount of time that is necessary to attain the desired temperature.

However, Non-Patent Document 1 does not mention concentration control of the methanol aqueous solution. If startup and shutdown of the system are repeated in a short period of time, the methanol aqueous solution becomes too thick because methanol fuel is inputted every time the system is started. The excessively thick solution causes excessive reaction and rapid temperature increase in the fuel cell stack, leading to temperature overshooting in the fuel cell stack and making the temperature control very difficult. Another disadvantage is reduced methanol fuel utilization efficiency due to too much input of the methanol fuel.

SUMMARY OF THE INVENTION

In order to overcome the problems described above, preferred embodiments of the present invention provide a fuel cell system that is capable of appropriately setting the amount of input of the fuel to be inputted to the fuel aqueous solution at system startup, and increasing the temperature of the fuel cell stack to a predetermined temperature within a short time without decreasing fuel utilization efficiency. Other preferred embodiments of the present invention provide a control method for the fuel cell system.

Further, other preferred embodiments of the present invention provide a fuel cell system that is capable of quickly supplying a sufficient amount of electricity, and a control method therefor.

According to one preferred embodiment of the present invention, a fuel cell system includes a fuel cell stack which is supplied with a fuel aqueous solution and generates electric energy by electro-chemical reaction, a concentration detector arranged to detect a concentration of the fuel aqueous solution to be supplied to the fuel cell stack, a temperature detector arranged to detect a temperature of the fuel cell stack, an input amount determining device arranged to determine an amount of fuel to be inputted to the fuel aqueous solution based on the concentration of the fuel aqueous solution detected by the concentration detector and the temperature of the fuel cell stack detected by the temperature detector, and an input device arranged to input the determined amount of the fuel to the fuel aqueous solution.

Another preferred embodiment of the present invention provides a control method for a fuel cell system including a fuel cell stack which is supplied with a fuel aqueous solution and generates electric energy by electro-chemical reaction. The method preferably includes the steps of detecting a concentration of the fuel aqueous solution to be supplied to the fuel cell stack, detecting a temperature of the fuel cell stack, determining an amount of fuel to be inputted to the fuel aqueous solution based on the detected concentration of the fuel aqueous solution and the detected temperature of the fuel cell stack, and inputting the determined amount of the fuel to the fuel aqueous solution.

According to preferred embodiments of the present invention, the temperature of fuel cell stack and the concentration of fuel aqueous solution are detected upon system startup, and the amount of input of the fuel is determined based on the temperature and the concentration. The determined amount of fuel is inputted to the fuel aqueous solution to obtain fuel aqueous solution of the determined concentration. This makes it possible to appropriately set the amount of fuel to be inputted to the fuel aqueous solution at the system startup, and to easily bring the fuel aqueous solution to a determined concentration. Therefore, it is possible to raise the temperature of the fuel cell stack to a predetermined level in a short period of time upon startup, without decreasing utilization efficiency of the fuel.

Preferably, the input amount determining device includes a memory arranged to store data which indicates a correspondence between the temperature of the cell stack and a target concentration of the fuel aqueous solution, a target concentration determining device arranged to determine the target concentration of the fuel aqueous solution by making reference to the data in the memory and based on the temperature of the fuel cell stack detected by the temperature detector, a fuel input amount determining device arranged to determine the amount of fuel to be input based on the concentration of the fuel aqueous solution detected by the concentration detector and the target concentration determined by the target concentration determining unit. In this case, the target concentration of the fuel aqueous solution is determined with reference to the data in the memory, the amount of input of the fuel is determined based on the concentration of the fuel aqueous solution and the target concentration, and then the determined amount of fuel is inputted to the fuel aqueous solution to obtain the fuel aqueous solution of the determined concentration. As described above, by making reference to the data in the memory, it becomes possible to determine the target amount easily, which makes easy to determine the amount of fuel input.

Further, preferably, the fuel cell system further includes a target temperature raise time setting device arranged to set a target temperature raise time which indicates a time necessary for increasing the temperature of the fuel cell stack to a predetermined temperature. The data in the memory includes data which indicates a correspondence between the temperature of the fuel cell stack, the target temperature raise time and the target concentration. The target concentration determining device determines the target concentration of the fuel aqueous solution by making reference to the data and based on the temperature of the fuel cell stack detected by the temperature detector and the target temperature raise time set by the target temperature raise time setting device. As described, the target concentration of the fuel aqueous solution is determined while taking the target temperature raise time also into account. This makes it possible to bring the fuel cell stack to a predetermined temperature within a certain period of time desired by the user, thereby increasing convenience.

Further preferably, the fuel cell system further includes a secondary battery which is electrically connected with the fuel cell stack, and an electric-charge detector arranged to detect an amount of electric charge in the secondary battery. The data in the memory includes data which indicates a correspondence between the temperature of the fuel cell stack, the amount of electric charge in the secondary battery and the target concentration. The target concentration determining device determines the target concentration of the fuel aqueous solution by making reference to the data and based on the temperature of the fuel cell stack detected by the temperature detector and the amount of electric charge in the secondary battery detected by the electric-charge detector.

If the secondary battery is used to provide supplement during the startup of power generation until the fuel cell stack reaches a predetermined temperature, the fuel cell stack must be brought to the predetermined temperature before the amount of electric charge in the secondary battery drops below a level at which it is capable of assisting the system. The smaller the amount of electric charge in the secondary battery, the quicker the temperature of the fuel cell stack must be raised to the predetermined temperature. Thus, the target concentration is determined while taking the amount of electric charge in the secondary battery also into account, and the temperature raise time of the fuel cell stack to the predetermined temperature is shortened accordingly to the amount of electric charge. This makes it possible to bring the fuel cell stack to a predetermined temperature appropriately during the power generation startup while maintaining the output from the fuel cell system.

Preferably, the fuel cell system further includes an ambient temperature detector arranged to detect an ambient temperature, and the input amount determining device corrects the determined amount of input of the fuel based on a difference between the temperature of the fuel cell stack and the ambient temperature. If the ambient temperature is lower than the temperature of the fuel cell stack, the temperature rise in the fuel cell stack is slow. Thus, by correcting the amount of input of the fuel based on the temperature difference between the two, it becomes possible to raise the temperature of the fuel cell stack smoothly.

Further, preferably, the memory preferably stores historical information about the concentration of the fuel aqueous solution, and the concentration of the fuel aqueous solution is obtained from the historical information if it is impossible to detect the concentration of the fuel aqueous solution by the concentration detector. The concentration is used for determining the target concentration. Therefore, even if it is impossible to detect the concentration of the fuel aqueous solution, it is possible to determine the target concentration and thus the amount of input of the fuel.

Further preferably, the historical information includes power generation data which indicates whether or not power generation was successful in the previous system startup, final concentration data which indicates a final concentration of the fuel aqueous solution detected by the concentration detector, and time data which indicates the time when the final concentration was detected by the concentration detector. In the event that it is impossible to detect the concentration of the fuel aqueous solution, if power generation was successful in the previous system startup, and a first predetermined time (e.g., six months) has not lapsed since the detection of the final concentration of the fuel aqueous solution indicated by the final concentration data stored in the memory, it is determined that the final concentration is reliable, and this final concentration is used as the concentration of the fuel aqueous solution. The target concentration is determined based on the final concentration.

Preferably, the historical information further includes input information of the fuel. In the event that it is not possible to detect the concentration of the fuel aqueous solution, if power generation was not successful in the previous system startup, or if the first predetermined time has been lapsed since the time of detection of the final concentration of the fuel aqueous solution indicated by the final concentration data stored in the memory, it is determined that the final concentration is not reliable, and so the final concentration value is not utilized and the amount of input of the fuel is determined based on the input information contained in the historical information.

Further, preferably, if a determination is made based on the input information that a second predetermined time (e.g., approximately 5 minutes-10 minutes) has passed since the previous input of the fuel, a determination is made that an amount of input of the fuel is necessary, and a predetermined amount of fuel is inputted. On the other hand, if a determination is made based on the input information that a second predetermined time has not passed since the previous input of the fuel, a determination is made that a necessary amount of fuel has already been supplied, and power generation is started without inputting the fuel additionally.

Another preferred embodiment of the present invention provides a fuel cell system including a fuel cell stack which is supplied with a fuel aqueous solution and generates electric energy by electro-chemical reaction, a concentration detector arranged to detect a concentration of a fuel aqueous solution to be supplied to the fuel cell stack, a secondary battery which is electrically connected with the fuel cell stack, an electric-charge detector arranged to detect an amount of electric charge in the secondary battery, an input amount determining device arranged to determine an amount of input of the fuel to be inputted to the fuel aqueous solution based on the concentration of the fuel aqueous solution detected by the concentration detector and the amount of electric charge in the secondary battery detected by the electric-charge detector, and an input device arranged to input the determined amount of fuel to the fuel aqueous solution.

Still another preferred embodiment of the present invention provides a control method for a fuel cell system including a fuel cell stack which is supplied with a fuel aqueous solution and generates electric energy by electro-chemical reaction and a secondary battery which is electrically connected with the fuel cell stack. The method includes the steps of detecting a concentration of the fuel aqueous solution to be supplied to the fuel cell stack, detecting an amount of electric charge in the secondary battery, determining an amount of fuel to be inputted to the fuel aqueous solution based on the detected concentration of the fuel aqueous solution and the detected amount of electric charge in the secondary battery, and inputting the determined amount of the fuel to the fuel aqueous solution.

According to various preferred embodiments of the present invention, at system startup, the amount of input of fuel is determined based on the amount of electric charge in the secondary battery and the concentration of the fuel aqueous solution. The determined amount of the fuel is inputted to the fuel aqueous solution to obtain fuel aqueous solution of the determined concentration. As described, it is possible to determine the amount of fuel to be inputted to the fuel aqueous solution when the system is started, taking into account the amount of electric charge in the secondary battery. This makes it possible to easily set the concentration of the fuel aqueous solution to a determined concentration. Therefore, it is possible to raise the temperature of the fuel cell stack to a predetermined level in a short period of time at system startup, without decreasing utilization efficiency of the methanol fuel.

Another preferred embodiment of the present invention provides a fuel cell system including a fuel cell stack which is supplied with a fuel aqueous solution and generates electric energy by electro-chemical reaction, and an input device arranged to input fuel to the fuel aqueous solution which is supplied to the fuel cell stack, at an end of power generation.

Still another preferred embodiment of the present invention provides a control method for a fuel cell system which includes a fuel cell stack which is supplied with a fuel aqueous solution and generates electric energy by electro-chemical reaction. Fuel is inputted to the fuel aqueous solution at an end of the power generation in order to increase a concentration of the fuel aqueous solution which is to be supplied to the fuel cell stack.

According to various preferred embodiments of the present invention, when power generation is finished, fuel is inputted to increase the concentration of the fuel aqueous solution above a normal operational concentration, in preparation for the next power generation. At the next startup, the start of the power generation can be done quickly, without inputting fuel or with only a small amount of input, making possible to supply sufficient power quickly.

Preferably, the fuel cell system further includes a concentration detector arranged to detect a concentration of the fuel aqueous solution at an end of power generation, a memory arranged to storing data which indicates a correspondence between the concentration of the fuel aqueous solution and the amount of input of the fuel, and a fuel input amount determining device arranged to determine an amount of fuel to be input by making reference to the data in the memory and based on the concentration of the fuel aqueous solution detected by the concentration detector. The input device inputs the determined amount of the fuel. By inputting the amount of fuel which is determined based on the concentration of the fuel aqueous solution at the end of power generation, it becomes possible to prepare, in advance, a fuel aqueous solution having a high concentration for the next start of power generation.

Further, preferably, the fuel cell system further includes a concentration detector arranged to detect a concentration of the fuel aqueous solution at an end of the power generation, an ambient temperature detector arranged to detect an ambient temperature at an end of the power generation, a memory arranged to store data which indicates correspondence between the ambient temperature and a target concentration of the fuel aqueous solution, a target concentration determining device arranged to determine a target concentration of the fuel aqueous solution by making reference to the data in the memory and based on an ambient temperature detected by the ambient temperature detector, and a fuel input amount determining device arranged to determine an amount of fuel to be inputted based on the concentration of the fuel aqueous solution detected by the concentration detector and the target concentration determined by the target concentration determining device. The input device inputs the determined amount of the fuel. In this case, the target concentration is determined based on the ambient temperature at the end of power generation, the amount of input of the fuel is determined based on the concentration of the fuel aqueous solution and the target concentration, and the determined amount of fuel is inputted. This makes it possible to prepare, in advance, a fuel aqueous solution having a high concentration for the next start of power generation.

Further preferably, the memory further stores final concentration data which indicates a final concentration of the fuel aqueous solution detected by the concentration detector. The concentration of the fuel aqueous solution is provided by the final concentration indicated by the final concentration data stored in the memory if it is impossible to detect the concentration of the fuel aqueous solution by the concentration detector at an end of power generation. As described, by storing in the memory the final concentration of the fuel aqueous solution detected by the concentration detector, it becomes possible to determine the amount of input of the fuel based on this final concentration even if it is impossible to detect the concentration of fuel aqueous solution at the end of power generation.

Another preferred embodiment of the present invention provides a fuel cell system including a fuel cell stack which is supplied with a fuel aqueous solution and generates electric energy by electro-chemical reaction, a temperature detector arranged to detect a temperature of the fuel cell stack, an input amount determining device arranged to determine an amount of fuel to be inputted to the fuel aqueous solution by a feedback control based on the temperature of fuel cell stack detected by the temperature detector so as to bring the temperature of the fuel cell stack to a target temperature, and an input device arranged to input the determined amount of fuel to the fuel aqueous solution.

Another preferred embodiment of the present invention provides a control method for a fuel cell system including a fuel cell stack which is supplied with a fuel aqueous solution and generates electric energy by electro-chemical reaction. The method includes the steps of determining a temperature of the fuel cell stack, determining an amount of fuel to be inputted to the fuel aqueous solution by a feedback control based on the detected temperature of fuel cell stack so as to bring the temperature of the fuel cell stack to a target temperature, and inputting the determined amount of the fuel to the fuel aqueous solution.

According to a preferred embodiment of the present invention, at system startup, a temperature of the fuel cell stack is detected. Then a feedback control is performed based on the temperature in order to determine the amount of fuel to be inputted so as to bring the temperature of the fuel cell stack to a target temperature. The determined amount of fuel is then inputted to the fuel aqueous solution. This process is repeated until the temperature of the fuel cell stack reaches the target temperature. This makes it possible to appropriately set the amount of fuel to be inputted to the fuel aqueous solution at the system startup without detecting the concentration of fuel aqueous solution, and to easily set the concentration of the fuel aqueous solution for the system startup to a desired concentration. Therefore, it is possible to increase the temperature of the fuel cell stack to a target temperature in a short period of time upon startup, without decreasing utilization efficiency of the fuel.

Preferably, the input amount determining device detects a temperature difference for a predetermined amount of time based on the temperature of the fuel cell stack detected by the temperature detector, and determines the amount of input of the fuel based on the temperature difference. In this case, the amount of input of the fuel can be determined easily.

Further, preferably, the input amount determining device includes a memory arranged to store data which relates to a temperature raise reference gradient corresponding to the temperature of the fuel cell stack and to the amount of input of the fuel, a temperature raise gradient detector arranged to detect a temperature raise gradient based on the temperature of the fuel cell stack detected by the temperature detector, and a fuel input amount determining device arranged to determine the amount of input of the fuel by making reference to the data in the memory and based on the temperature raise gradient detected by the temperature raise gradient detector.

In this case, the amount of input of the fuel is determined by making reference to the data in the memory and based on the temperature raise gradient of the fuel cell stack. Specifically, the temperature of the fuel cell stack is detected in a predetermined interval to obtain the temperature raise gradient. If the obtained temperature raise gradient is smaller than the corresponding temperature raise reference gradient stored in the memory, the amount of fuel corresponding to the reference gradient is chosen as the amount of fuel to be inputted, and this amount of fuel is inputted to the fuel aqueous solution. On the other hand, if the obtained temperature raise gradient is not smaller than the corresponding temperature raise reference gradient stored in the memory, no fuel is inputted. As described, by making reference to the data in the memory, the necessity for and the amount of input of the fuel can be determined easily.

Further preferably, the input amount determining device determines the amount of input of the fuel preferably by a PID control based on a difference between the target temperature and the temperature of the fuel cell stack detected by the temperature detector. By simply inputting the amount of fuel determined by the PID control, the temperature of the fuel cell stack reaches the target temperature in a short time. Further, since the temperature of the fuel cell stack can be detected easily, PID control is easy.

The fuel cell systems described above are suitably applied to transportation equipment and any type of vehicle.

The term "target concentration of the fuel aqueous solution" is a concentration level toward which control is made when supplying the fuel aqueous solution to the fuel cell stack at the time the fuel cell system starts power generation. The target is set to a higher concentration than the concentration for normal power generating operation.

The term "final concentration of the fuel aqueous solution" means the latest (the most recent) concentration level of fuel aqueous solution among those detected by the concentration detector.

The term "temperature raise gradient" means the amount of temperature increase per a unit of time period.

The term "temperature raise reference gradient" is a value for comparison with the fuel cell stack temperature raise gradient in order to determine whether or not the fuel should be inputted.

Other features, elements, steps, characteristics and advantages of the present invention will become more apparent from the following detailed description of preferred embodiments thereof with reference to the attached drawings.

BRIEF DESCRIPTION OF THE DRAWINGS

FIG. 3 is a table showing a relationship between fuel cell stack temperature and target concentration.

FIG. 6(a) is a table which shows an amount of correction corresponding to a temperature difference between fuel cell stack temperature and ambient temperature.

FIG. 6(b) is a table which shows correspondence between the amount of charge in the secondary battery and target concentration.

FIG. 10 is a table which shows a relationship between the methanol aqueous solution concentration and an amount of input of methanol fuel F during the shutdown when the target concentration is 6 weight percent.

FIG. 12 is a table which shows a relationship between ambient temperature and target concentration.

FIG. 13 is a table which shows correspondence between a temperature range of the fuel cell stack, a temperature raise reference gradient and an amount of fuel input.

FIG. 15 is a block diagram which shows a control system in a preferred embodiment which utilizes PID control.

DETAILED DESCRIPTION OF PREFERRED EMBODIMENTS

Hereinafter, preferred embodiments of the present invention will be described with reference to the drawings.

Figure 1:
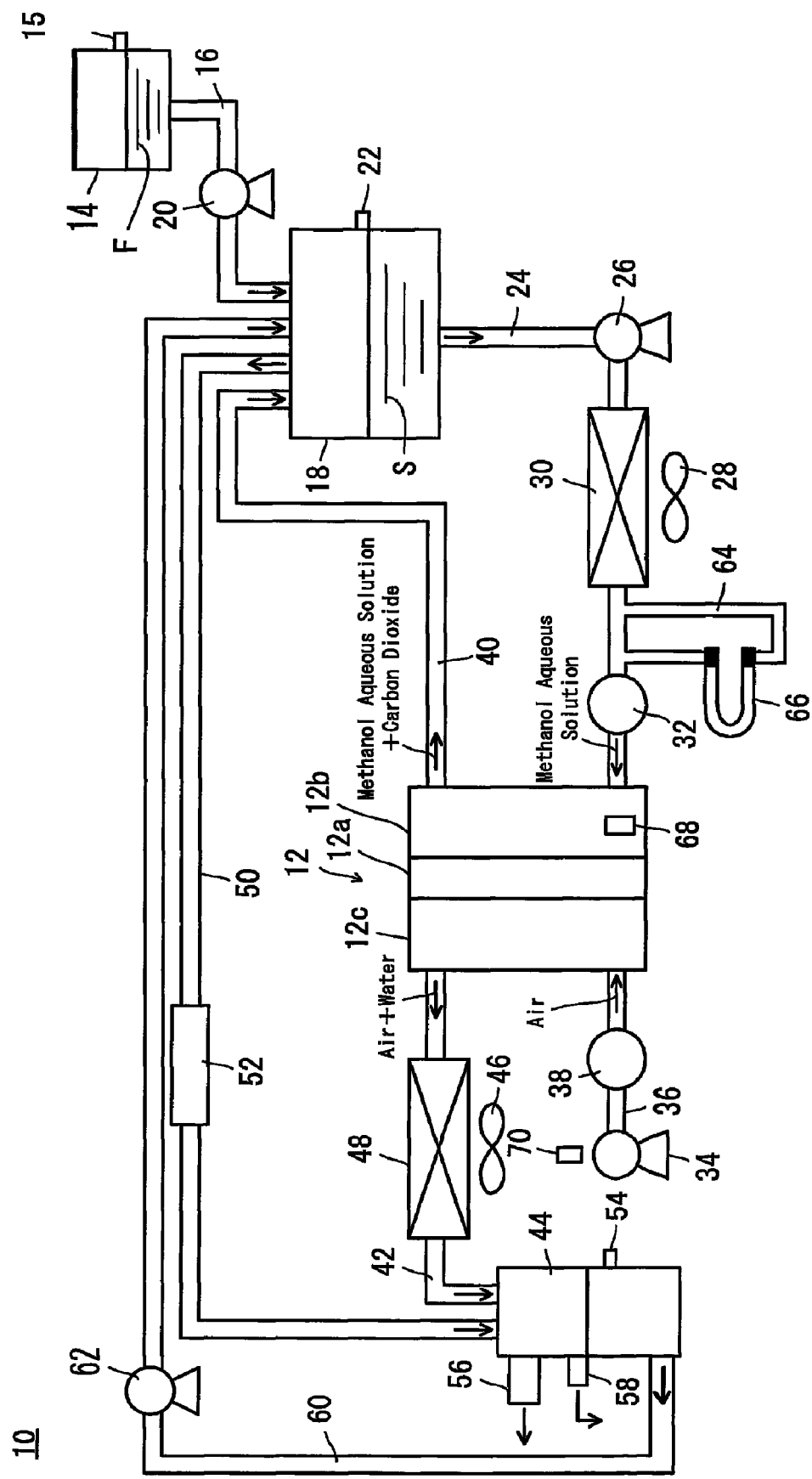
FIG. 1 is a schematic drawing showing a primary portion of a preferred embodiment of the present invention.

Referring to FIG. 1, a fuel cell system 10 according to a preferred embodiment of the present invention is a direct methanol fuel cell system, and includes a fuel cell stack 12. The fuel cell stack 12 includes an electrolyte film provided by a solid high polymer film 12a, and an anode (fuel electrode) 12b and a cathode (air electrode) 12c which sandwich the solid high polymer film 12a.

The fuel cell system 10 includes a fuel tank 14 which can hold a highly concentrated methanol fuel (an aqueous solution containing approximately 50 weight percent of methanol, for example) F. The fuel tank 14 is connected, via a fuel supply pipe 16, with an aqueous solution tank 18 containing methanol aqueous solution S. The fuel supply pipe 16 is provided with a fuel pump 20. The fuel pump 20 supplies the aqueous solution tank 18 with the methanol fuel F from the fuel tank 14. During normal power generation (when the fuel cell stack 12 is operating stably after a target temperature has been reached), the concentration of methanol aqueous solution S in the aqueous solution tank 18 is maintained at approximately 3 weight percent, for example. As will be described later however, at the beginning of power generation (startup), the concentration of the methanol aqueous solution S is maintained at a higher level.

The fuel tank 14 is provided with a level sensor 15 for detecting the level of methanol fuel F in the fuel tank 14. The aqueous solution tank 18 is provided with a level sensor 22 for detecting the level of methanol aqueous solution S in the aqueous solution tank 18. The aqueous solution tank 18 is connected, via an aqueous solution pipe 24, with the anode 12b of the fuel cell stack 12. The aqueous solution pipe 24 is provided with an aqueous solution pump 26, a heat exchanger 30 equipped with a cooling fan 28, and an aqueous solution filter 32, respectively from the upstream side. The methanol aqueous solution S in the aqueous solution tank 18 is pumped by the aqueous solution pump 26 toward the anode 12b, cooled by the heat exchanger 30 as necessary, purified by the aqueous solution filter 32 before supplied to the anode 12b. As described above, the methanol aqueous solution S is controlled at a predetermined concentration, at a predetermined temperature and at a predetermined amount in its circulatory supply to the fuel cell stack 12.

On the other hand, the cathode 12c in the fuel cell stack 12 is connected with an air pump 34 via an air pipe 36. The air pipe 36 is provided with an air filter 38. Thus, air which contains oxygen is sent from the air pump 34, purified by the air filter 38 and then supplied to the cathode 12c.

The anode 12b and the aqueous solution tank 18 are connected to each other via a pipe 40, so unused methanol aqueous solution and generated carbon dioxide discharged from the anode 12b are supplied to the aqueous solution tank 18.

Further, the cathode 12c is connected with the water tank 44 via a pipe 42. The pipe 42 is provided with a gas-liquid separator 48 equipped with a cooling fan 46. Water which is produced by the power generation reaction is discharged from the cathode 12c, and flows through the pipe 42 into the water tank 44. The aqueous solution tank 18 and the water tank 44 are connected to each other via the $CO_2$ vent pipe 50. The $CO_2$ vent pipe 50 is provided with a methanol trap 52 which separates the methanol aqueous solution S. The carbon dioxide discharged from the aqueous solution tank 18 is thus supplied to the water tank 44.

The water tank 44 is provided with a level sensor 54, which detects the level of water in the water tank 44. The water tank 44 is provided with an exhaust gas pipe 56 and water drain 58. The exhaust gas pipe 56 discharges carbon dioxide whereas the water drain 58 discharges water exceeding a predetermined amount. The water tank 44 is connected with the aqueous solution tank 18 via the water recycling pipe 60. The water recycling pipe 60 is provided with a water pump 62. Therefore, water in the water tank 44 is returned by the water pump 62 to the aqueous solution tank 18.

Further, in the aqueous solution pipe 24, a bypass pipe 64 is formed between the heat exchanger 30 and the aqueous solution filter 32.

Figure 2:
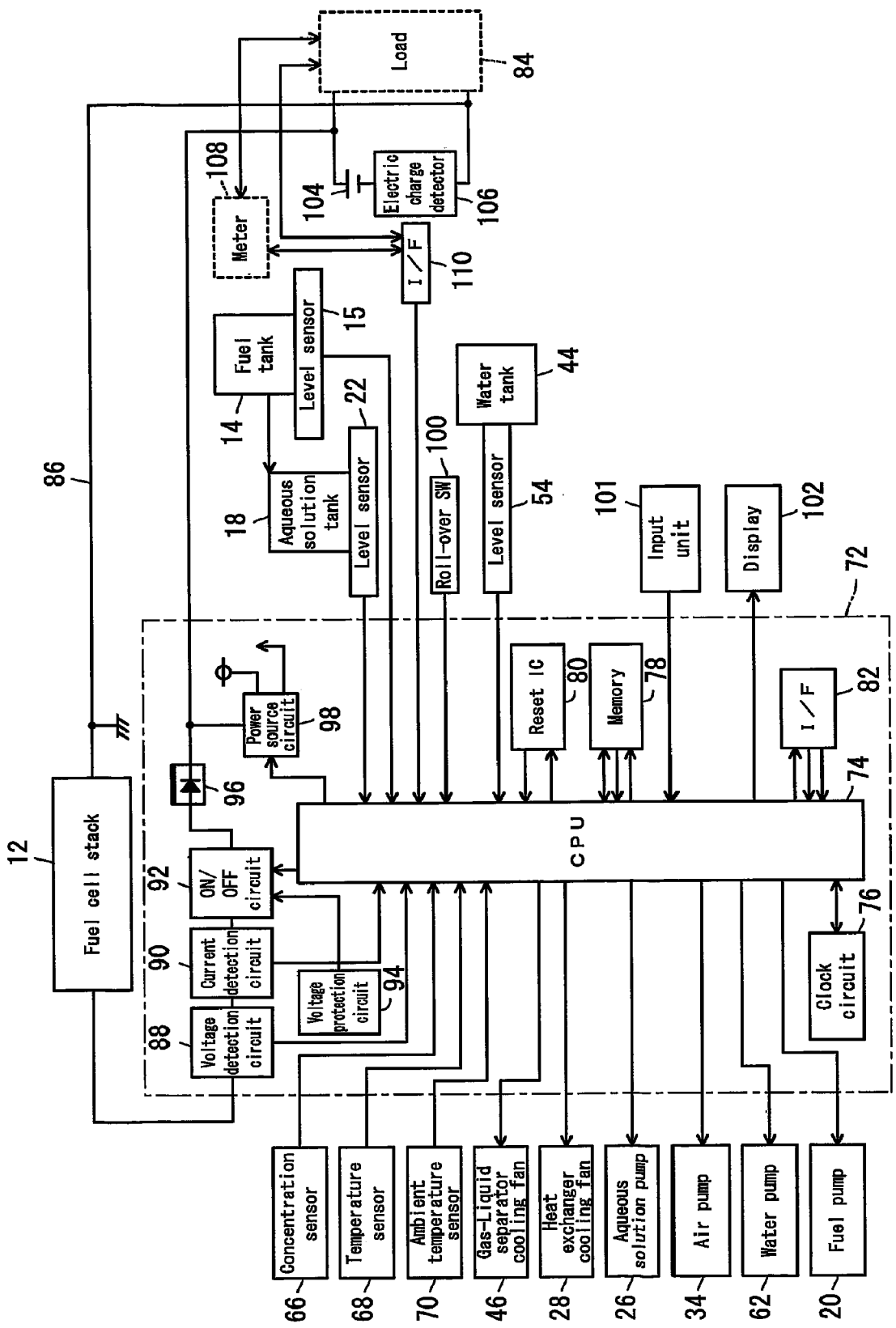
FIG. 2 is a block diagram showing an electric configuration of a preferred embodiment of the present invention.

Referring also to FIG. 2, the bypass pipe 64 is provided with a concentration sensor 66 which detects the concentration of methanol aqueous solution S. A temperature sensor 68 which detects the temperature of fuel cell stack 12 is attached to the fuel cell stack 12. An ambient temperature sensor 70 which detects ambient temperature is provided near the air pump 34. Alternatively, detection may be made for the temperature of the circulating methanol aqueous solution S instead of the temperature of cell stack itself, and this aqueous solution temperature may be used as the temperature of the fuel cell stack 12.

The concentration sensor 66 is preferably constituted by, e.g., an ultrasonic sensor for measurement of variation in sonic speed caused by a concentration change in methanol. In this case, the aqueous solution is preferably disposed between an ultrasonic transmitter and an ultrasonic receiver. The transmitter may be a PKH3-512B1S (manufactured by Murata Manufacturing Co., Ltd.) and the receiver may be a PKH3-512B1R (manufactured by Murata Manufacturing Co., Ltd.). The ultrasonic wave travels at different speeds depending on the concentration of the aqueous solution, so the methanol concentration of the aqueous solution can be measured based on this principle. Alternatively, the concentration of the methanol aqueous solution S may be measured by using the weight, refraction index, viscosity, optical refraction or electric resistance of the methanol.

As shown in FIG. 2, the fuel cell system 10 includes a control circuit 72.

The control circuit 72 preferably includes a CPU 74 which performs necessary arithmetic operations and controls the operation of the fuel cell system 10, a clock circuit 76 which provides the CPU 74 with clock signals, a memory 78 which stores programs, data and calculation data etc. used to control the fuel cell system 10, and may include an EEPROM, for example, a reset IC 80 which prevents the fuel cell system 10 from malfunctioning, an interface circuit 82 for connection with external devices, a voltage detection circuit 88 which detects the voltage in an electric circuit 86 for connecting the fuel cell stack 12 with a load 84, an electric current detection circuit 90 which detects a current flowing in the electric circuit 86, an ON/OFF circuit 92 opens and closes the electric circuit 86, a voltage protection circuit 94 which prevents over voltage in the electric circuit 86, a diode 96 provided in the electric circuit 86, and a power source circuit 98 which supplies a predetermined voltage to the electric circuit 86.

In the control circuit 72, the CPU 74 is supplied with detection signals from the concentration sensor 66, the temperature sensor 68 and the ambient temperature sensor 70, as well as detection signals from a roll-over switch 100 which detects whether or not the vehicle has rolled over, and signals from an input unit 101 for settings and data input. Further, the CPU 74 is supplied with detection signals from the level sensors 15, 22 and 54.

The CPU 74 provides control of components such as the fuel pump 20, the aqueous solution pump 26, the air pump 34, the heat exchanger cooling fan 28, the gas-liquid separator cooling fan 46, and the water pump 62, as well as a display 102 which displays various information.

Further, the fuel cell stack 12 has a parallel connection with the secondary battery 104, which is connected with an electric charge detector 106 that detects the amount of electric charge in the secondary battery 104. The secondary battery 104, which is connected with the electric charge detector 106, is also connected in parallel with the load 84. The secondary battery 104 provides power which supplements power output from the fuel cell stack 12, charged by the fuel cell stack 12 with electric energy, and discharges the stored electric energy to operate the load 84 and the components mentioned above.

The load 84 is connected with a meter 108 for various measurements on the load 84. Data and status information about the load 84 measured by the meter 108 are supplied to the CPU 74 via an interface circuit 110. An example of the load 84 is a motor which drives transport equipment.

Figure 4:
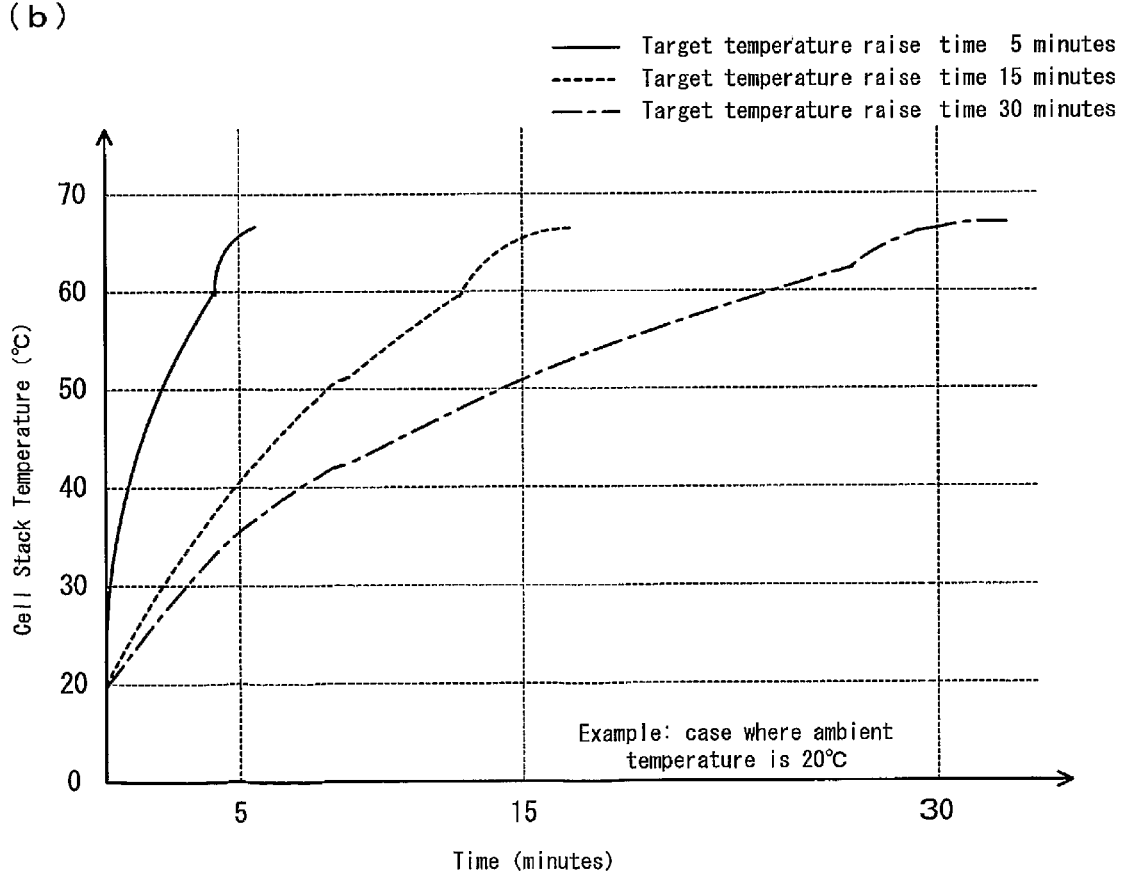
FIG. 4(a) is a table which shows correspondence between fuel cell stack temperature, target temperature raise time and target concentration.
FIG. 4(b) is a graph which shows correspondence between the time passed since the beginning of power generation in the fuel cell stack and fuel cell stack temperature for each target temperature raise time.
Figure 5:
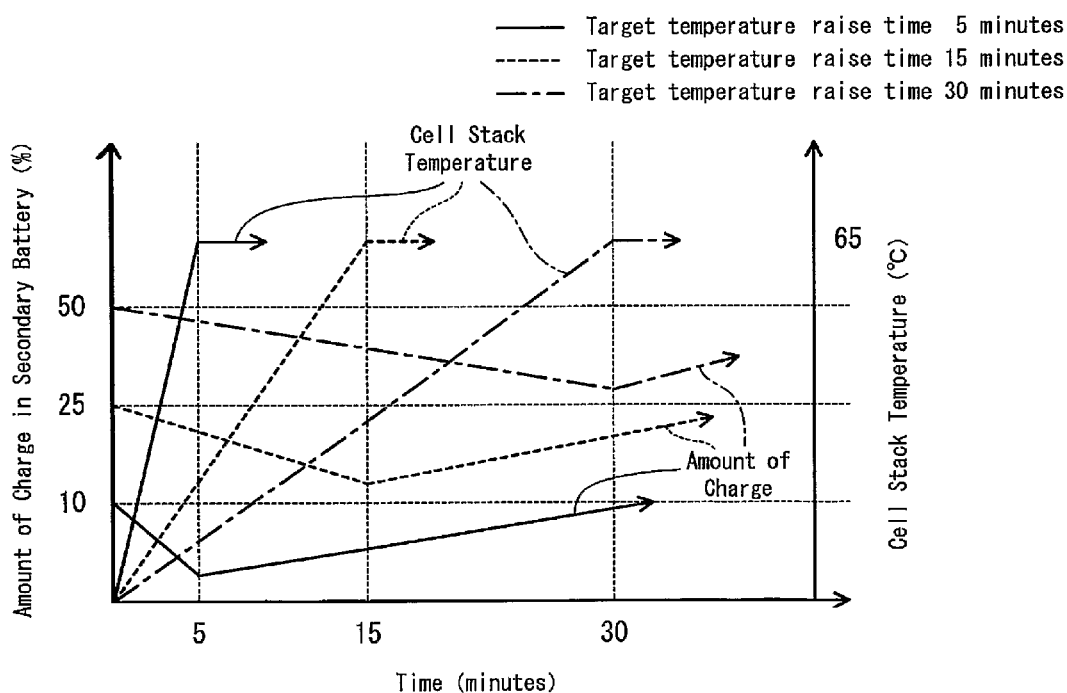
FIG. 5(a) is a table which shows correspondence between an amount of charge in a secondary battery and target temperature raise time.
FIG. 5(b) is a graph which shows correspondence between the time passed since the beginning of power generation in the fuel cell stack and the amount of charge in the secondary battery, and correspondence between the time passed and the fuel cell stack temperature for each target temperature raise time.
FIG. 5(c) is a table which shows correspondence between the fuel cell stack temperature, the amount of charge in the secondary battery and target concentration.

The memory 78 stores various data such as table data as shown in FIG. 3 which relates the temperature of the fuel cell stack to the target concentration, table data as shown in FIG. 4(*a*) which relates the temperature of the fuel cell stack 12 and the target temperature raise time to the target concentration, table data as shown in FIG. 5(*a*) which relates the amount of electric charge in the secondary battery 104 to target temperature raise time, table data as shown in FIG. 5(*c*) which relates the temperature of the fuel cell stack 12 and the amount of electric charge in the secondary battery 104 to the target concentration, table data as shown in FIG. 6(*a*) which relates an amount of correction for a difference between the temperature of the fuel cell stack 12 and the ambient temperature, table data as shown in FIG. 6(*b*) which relates the amount of electric charge in the secondary battery 104 to the target concentration, table data as shown in FIG. 10 which relates the concentration of methanol aqueous solution S at the end of power generation to the amount of input of methanol fuel F, and table data as shown in FIG. 12 which relates the ambient temperature to the target concentration. Further, the memory 78 stores programs and other information necessary for operations shown in FIG. 7, FIG. 8, FIG. 9 and FIG. 11.

FIG. 4(*b*) is a graph which shows a relationship between the time passed since the beginning of power generation in the fuel cell stack 12 and the temperature of fuel cell stack 12 for each target temperature raise time, when the ambient temperature is approximately 20° C.

FIG. 5(*b*) is a graph which shows a relationship between the time passed since the beginning of power generation in the fuel cell stack 12 and the amount of charge in the secondary battery 104 and a relationship between the time passed and the temperature of the fuel cell stack 12, for each target temperature raise time. FIGS. 5(*a*) and (*b*) indicates the principle that the smaller the amount of electric charge in the secondary battery 104, the more quickly the temperature of the fuel cell stack 12 must be raised to a predetermined temperature (for example, approximately 65° C. The amount of electric charge in the secondary battery 104 is maintained so as not to be lower than about 10% in terms of charging rate before beginning power generation.

The memory 78 stores historical information of the concentration of methanol aqueous solution S.

The historical information at least includes generation data which indicates if the previous generation startup was successful (i.e., if the temperature was raised appropriately and the system operated stably), final concentration data which indicates the final concentration of the methanol aqueous solution S detected by the concentration sensor 66, time data which indicates when the detection of the final concentration was made by the concentration sensor 66, and input information which indicates the amount and the time when methanol fuel F was inputted. In this preferred embodiment, the concentration of methanol aqueous solution S is detected at a predetermined time interval (e.g. every minute) by the concentration sensor 66, and the data in the memory 78 is updated in such a way that the final concentration data and earlier concentration data for a predetermined amount of time are stored together with corresponding time data.

In the present preferred embodiment, the CPU 74 and the memory 78 are preferably included in and constitute an input amount determining device. Further, the CPU 74 also defines a target concentration determining device and a fuel input amount determining device. The fuel supply pipe 16 and fuel pump 20 are preferably included in the input device.

Next, description will be made for an example of a startup operation of the fuel cell system 10 which has been described above.

Figure 7:
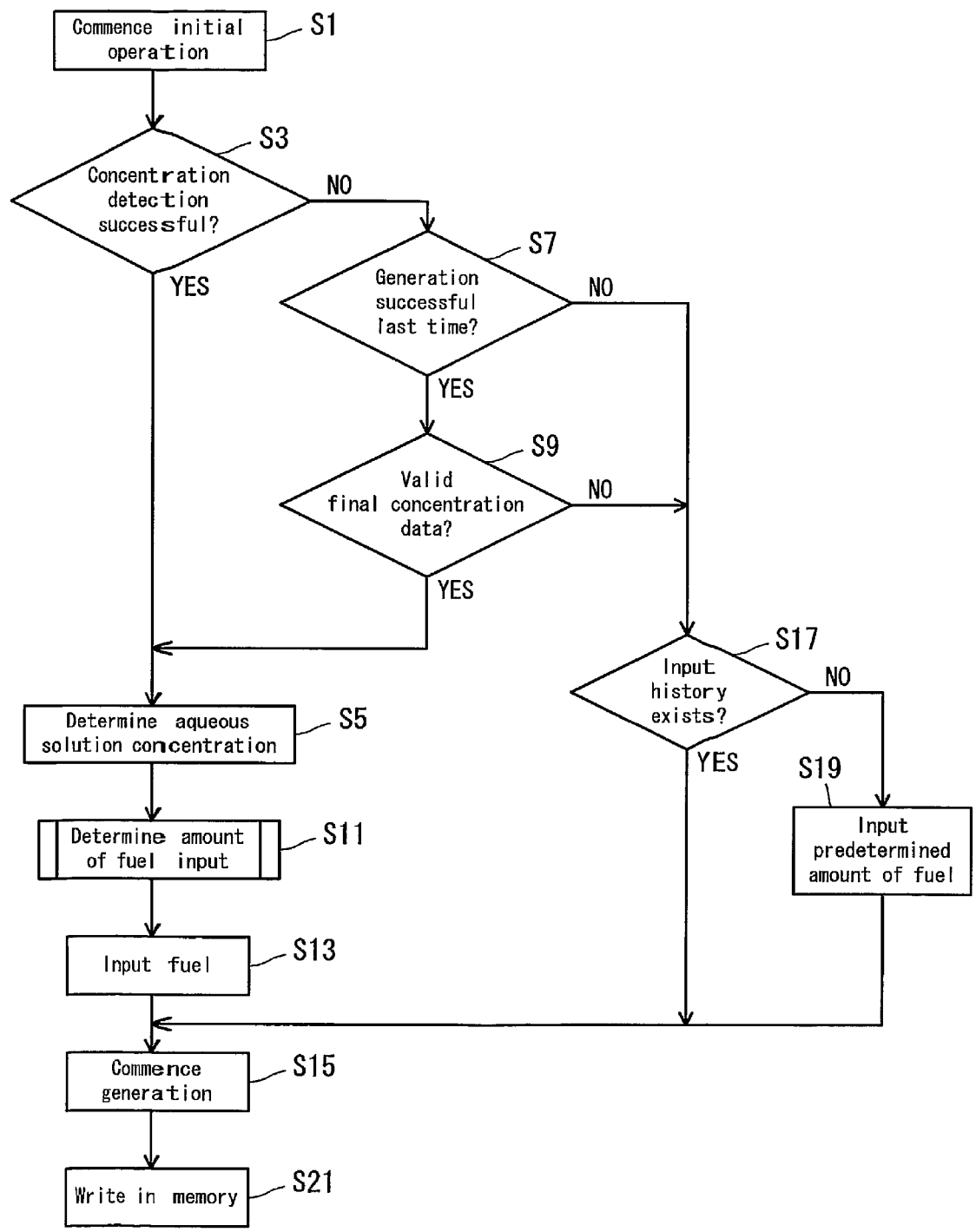
FIG. 7 is a flowchart which shows an example of startup operation of a system according to a preferred embodiment of the present invention.

Referring to FIG. 7, an initial operation of the fuel cell system 10 is commenced (Step S1), which enables the components such as the pumps and the cooling fans.

Then, the system checks if the concentration sensor 66 has detected the concentration of the methanol aqueous solution S successfully (Step S3). For example, if the concentration sensor 66 is defined by an ultrasonic sensor, there is a likelihood that the sensor cannot detect when air bubbles are included in the solution, for example. Particularly, after the fuel cell system 10 has been shut down for a long period of time, it may not be possible to detect the concentration properly upon re-startup, due to air bubbles which may have accumulated in the pipes.

If the concentration detection of the methanol aqueous solution S is successful, the detected value is determined to be the concentration of the methanol aqueous solution S (Step S5).

On the other hand, if the concentration detection of the aqueous solution S is not successful in Step S3, generation data stored in the memory 78 is referred to, in order to see if power generation was made successfully in the previous system startup (Step S7). For example, the system checks if the previous startup was followed by an immediate shutdown. If the previous power generation was successful, the system checks whether or not the final concentration data is valid or not, i.e. the final concentration of the methanol aqueous solution S detected by the concentration sensor 66 is valid or not (Step S9). In this determination, the system checks if a predetermined period of time (e.g., six months) has passed since the concentration sensor 66 detected the final concentration which is indicated by this particular final concentration data. The check can be made based on the time data, and the data is determined to be valid if the predetermined period of time has not passed yet whereas it is determined as invalid if the predetermined period of time has already passed. The reason for having such a determination basis is that if the predetermined period of time has passed since the detection of the final concentration, there is a high probability that the methanol has evaporated to significantly alter the concentration of the aqueous solution, and the final concentration is significantly different from the concentration measured at the current system startup.

If the system determines that the final concentration data is valid in Step S9, the process advances to Step S5, where the final concentration indicated by the current final concentration data is set as the concentration of the methanol aqueous solution S.

Figure 8:
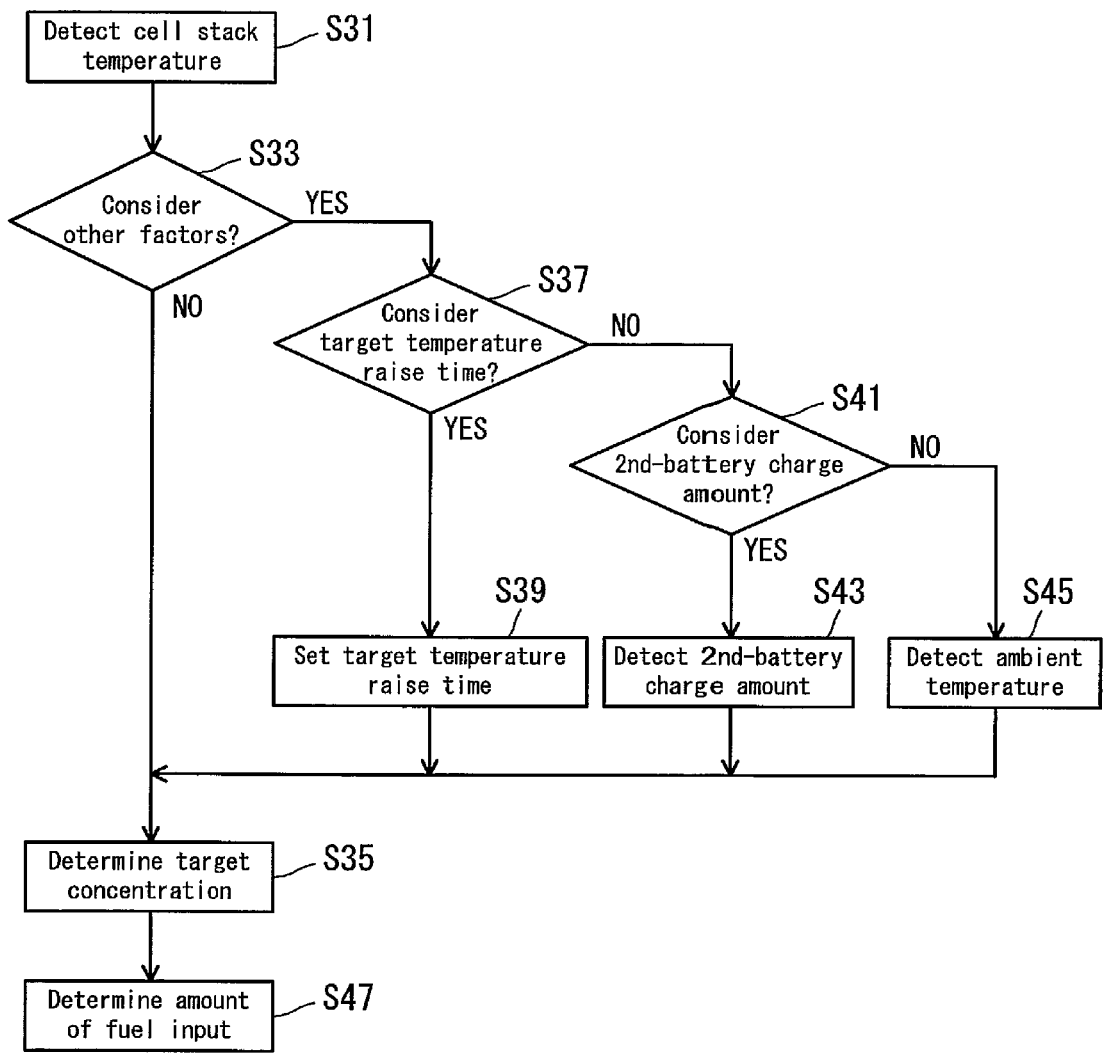
FIG. 8 is a flowchart which shows an example of process to determine an amount of fuel input.

Then, a process shown in FIG. 8 determines the amount of input of methanol fuel F (Step S11), and the fuel pump 20 is operated for a period of time necessary for inputting the determined amount of methanol fuel F. The methanol fuel F is inputted (Step S13), and thereafter, the fuel cell system 10 begins power generation (Step S15).

On the other hand, if Step S7 finds that power generation was not successful in the previous time, or if Step S9 determines that the concentration data is invalid, the process goes to Step S17.

Step S17 checks input information of methanol fuel F to see if there is input history in the past predetermined period (e.g., 5 minutes through 10 minutes).

If there is any input history within the predetermined past period (e.g., the system was shut down during the startup sequence), the concentration of methanol aqueous solution S is likely to be high enough, so methanol fuel F is not inputted to the methanol aqueous solution S and the process goes to Step S15, where the fuel cell system 10 begins power generation. This prevents the system from repeating the startup sequence which would concentrate the aqueous solution to an unnecessarily high level.

On the other hand, if Step S17 finds no input history within the predetermined past period, the fuel pump 20 is operated for a predetermined period of time so as to input a predetermined amount of methanol fuel F which is set in advance (Step S19). Then, the process goes to Step S15, where the fuel cell system 10 begins power generation.

After the power generation has been started, the system stores power generation data which indicates whether the power generation startup was successful, in the memory 78. If the answer in Step S3 was YES, concentration data which indicates the detected concentration and time data which corresponds to the concentration data are also stored (Step S21). Further, the system stores input information which indicates the amount of input and the time of input of the methanol fuel F, in the memory 78.

Hereafter, normal power generation in the fuel cell stack 12 will be described briefly.

When power generation is started, the highly concentrated methanol aqueous solution S which is stored in the aqueous solution tank 18 is pumped by the aqueous solution pump 26 toward the fuel cell stack 12. The solution is purified by the aqueous solution filter 32, and then supplied to the anode 12b. On the other hand, air which contains oxygen is pumped by the air pump 34 toward the fuel cell stack 12. The air is first purified by the air filter 38 and then supplied to the cathode 12c.

On the anode 12b in the fuel cell stack 12, methanol and water in the methanol aqueous solution S react electro-chemically with each other to produce carbon dioxide and hydrogen ions. The produced hydrogen ions move through the solid high polymer film 12a to the cathode 12c, where the hydrogen ions react with oxygen in the air supplied to the cathode 12c, to produce water vapor and electric energy.

The amount of generated power increases gradually until the fuel cell stack 12 reaches a target temperature (for example, approximately 65° C.). Once the temperature reaches the target temperature, the desired amount of power becomes available. During normal operation, the methanol aqueous solution S is cooled by the heat exchanger 30. By adjusting the number of revolutions of the cooling fan 28, the temperature of the methanol aqueous solution S is maintained at a predetermined level.

Carbon dioxide which occurred on the anode 12b in the fuel cell stack 12 flows through the pipe 40, the aqueous solution tank 18 and $CO_2$ vent pipe 50, and is supplied to the water tank 44, and then discharged from the exhaust gas pipe 56. On the other hand, most of the water vapor occurred on the cathode 12c in the fuel cell stack 12 is liquefied and discharged as water. Water discharged in the form of gas goes through the gas-liquid separation process in the gas-liquid separator 48. Dry air resulting from the gas-liquid separation flows through the water tank 44 and is discharged from the exhaust gas pipe 56. Water discharged from the cathode 12c and water resulting from the gas-liquid separation process are collected in the water tank 44, and pumped back to the aqueous solution tank 18 by the water pump 62.

Next, reference will be made to FIG. 8, and description will cover a fuel input amount determining process in Step 7.

First, the temperature of the fuel cell stack 12 is detected by the temperature sensor 68 (Step S31).

Next, the system checks if other factors should be considered (Step S33). If no other factors will be considered, the process goes to Step S35, where reference is made to table data shown in FIG. 3, and a target concentration is determined based on the temperature of the fuel cell stack 12.

If other factors are to be considered, the system checks if the target temperature raise time should be considered (Step S37). If the target temperature raise time is to be considered, a target temperature raise time is set (Step S39). In the present preferred embodiment, the target temperature raise time is preferably selected from three different times (for example, 5 minutes, 15 minutes and 30 minutes) as shown in FIG. 4. The user selects a desired time using an input unit 101, and thus the target temperature raise time is set. Thereafter, the process goes to Step S35, where reference is made to table data shown in FIG. 4(a), and a target concentration is determined based on the temperature of the fuel cell stack 12 and the target temperature raise time.

If the target temperature raise time is not considered, the system checks if the amount of electric charge in the secondary battery 104 is to be considered (Step S41). If the amount of electric charge in the secondary battery 104 is to be considered, the electric charge detector 106 detects the amount of electric charge in the secondary battery 104 (Step S43). Thereafter, the system goes to Step S35, where reference is made to table data shown in FIG. 5(c) and a target concentration is determined based on the temperature of the fuel cell stack 12 and the amount of electric charge in the secondary battery 104. In the tables shown in FIGS. 5(a) and 5(b) as well as FIG. 6(b), the amount of electric charge is expressed in terms of a ratio (percent) of the current amount of electric charge to the full charge amount. The amount of electric charge may be expressed in the absolute amount of charge (Ah) in place of the ratio. In the present preferred embodiment, the amount of electric charge in the secondary battery 104 is detected based on a current value. However, the amount of electric charge in the secondary battery 104 may be detected based on a voltage.

If the amount of electric charge in the secondary battery 104 is not considered, a difference between the temperature of fuel cell stack 12 and the ambient temperature will be considered. Thus, the ambient temperature sensor 70 detects the ambient temperature (Step S45), and then the system goes to Step S35, where reference is made to table data shown in FIG. 3, and a target concentration is determined based on the temperature of the fuel cell stack 12.

The amount of methanol aqueous solution S in the aqueous solution tank 18 and the concentration of methanol fuel F is already known. Thus, the amount of methanol in the aqueous solution tank 18 is calculated from the obtained concentration of the methanol aqueous solution S, and the amount of input of methanol fuel F necessary to attain the target concentration is determined (Step S47). If the difference between the temperature in the fuel cell stack 12 and the ambient temperature is considered, reference is made to table data shown in FIG. 6(a) and the amount of correction to be made to methanol fuel F is determined, as an addition to the amount of input.

There are different modes for the determining the target concentration: in one mode, the determination of the target concentration is based on the temperature of fuel cell stack 12; in another mode, the determination of the target concentration is based on the temperature of fuel cell stack 12 and the target temperature raise time; in still another mode, the determination of the target concentration is based on the temperature of fuel cell stack 12 and the amount of electric charge in the secondary battery 104. Further, there is a mode in which correction is made based on a temperature difference.

The target concentration may be determined with reference to table data shown in FIG. 6(b) based on the amount of electric charge in the secondary battery 104. As understood from FIG. 6(b), setting is made so that the target concentration will be higher if the amount of electric charge is smaller. Once the target concentration has been determined in this way, then the amount of input of methanol fuel F is determined as has been described, and this determined amount of methanol fuel F is inputted.

The user can predetermine which mode is to be selected. Additionally, the target temperature raise time may be preset.

The fuel cell system 10 described above enables an appropriately set amount of methanol fuel F to be inputted to methanol aqueous solution S at the time of system startup, and to easily set the concentration of methanol aqueous solution S to a given concentration. Therefore, it is possible to raise the temperature of the fuel cell stack 12 to a predetermined level in a short time, without decreasing utilization efficiency of methanol fuel F.

The target temperature raise time is also considered in determining the target concentration of the methanol aqueous solution S. This makes it possible to increase the temperature of fuel cell stack 12 to a desired temperature within a time desired by the user, which offers increased convenience.

Until the temperature of the fuel cell stack 12 reaches a predetermined temperature (for example, approximately 65° C., it is impossible to obtain an appropriate amount of power from the fuel cell stack 12, so the system must run at a deficit, which is supplemented by the secondary battery 104 to drive the various components. Since the deficit is greater than the amount of power generated, during the startup, the system could halt if the secondary battery 104 does not have an appropriate amount of charge and runs out of the charge before the fuel cell stack 12 reaches the predetermined temperature. However, in the fuel cell system 10, the amount of electric charge in the secondary battery 104 is taken into account when determining the target concentration. More specifically, the target concentration is set according to a principle that the smaller the amount of electric charge, the shorter is the temperature raising time for the fuel cell stack 12 to attain the predetermined temperature. This makes it possible to raise the temperature of the fuel cell stack 12 appropriately to a predetermined temperature while maintaining output from the fuel cell system 10, during the startup of power generation.

Further, when the ambient temperature is lower than the temperature of fuel cell stack 12, an additional correction is made to the amount of the input methanol fuel F, based on the temperature difference. This further increases the concentration of the methanol aqueous solution S, thereby facilitating the temperature increase in the fuel cell stack 12.

Further, even if the occurrence of air bubbles, etc. has made it impossible for the concentration sensor 66 to detect the concentration of the methanol aqueous solution S, it is possible to determine the target concentration and the amount of input methanol fuel F, based on the historical information in the memory 78.

It should be noted that in the above-described preferred embodiment, methanol fuel F is preferably inputted after the target concentration is determined. However, if the temperature raising speed is not to be considered, data which gives the amount of input corresponding to the concentration information and the cell stack temperature may be stored in the memory 78, and the amount of input of methanol fuel F may be determined by referring to this data, based on the detected methanol aqueous solution concentration and the cell stack temperature.

Next, reference will be made to FIG. 9 and description will be provided for an example of shutdown operation of the power generation by fuel cell stack 12.

When power generation by the fuel cell stack 12 is finished (Step S51), the concentration sensor 66 detects the concentration of methanol aqueous solution S. If the concentration of the methanol aqueous solution S is detected successfully (Step S53: YES), the system makes reference to table data which is shown in FIG. 10 and stored in the memory 78, and determines the amount of input of methanol fuel F based on the concentration of the detected methanol aqueous solution S (Step S55). On the other hand, if detection of the concentration of the methanol aqueous solution S is not successful (Step S53: NO), the system reads final concentration data which indicates the final concentration of the methanol aqueous solution S, and corresponding time data from the memory 78. The system then checks if this final concentration data is valid or not (Step S57). Whether or not the final concentration data is valid is determined by checking if a predetermined period of time (e.g., six months) has passed since the concentration sensor 66 detected the final concentration represented by this particular final concentration data. So this is determinable on the basis of time data. If the predetermined period of time has not passed, the data is determined to be valid whereas it is determined to be invalid if the predetermined period of time has passed.

If the final concentration data is valid, the amount of fuel input is determined based on that information (Step S55), and then the determined amount of methanol fuel F is inputted (Step S59). If the answer in Step S53 is YES, then the concentration data which indicates the detected concentration, and corresponding time data are stored in the memory 78 (Step S61), and the system shuts down (Step S63).

On the other hand, if Step S57 determines that the final concentration data is invalid, no methanol fuel F is inputted, nor is the writing of concentration data made into the memory 78, and the process goes to Step S63.

According to the fuel cell system 10 which operates as described above, when power generation is finished, methanol fuel F is inputted to increase the concentration of methanol aqueous solution S in preparation for the next power generation, thereby accelerating power generation and supplying sufficient power quickly without inputting or with inputting just a little amount of methanol fuel F in the next system startup.

Also, by storing the final concentration of methanol aqueous solution S which is detected by the concentration sensor 66 in the memory 78, it becomes possible to determine the amount of input of methanol fuel F by using the stored final concentration even if the concentration of methanol aqueous solution S was not detected at the shutdown of power generation.

Further, reference will be made to FIG. 11 for describing another shutdown operation example of power generation by the fuel cell stack 12.

When power generation by the fuel cell stack 12 is finished (Step S71), the ambient temperature sensor 70 detects the ambient temperature (Step S73). The system then makes reference to table data stored in the memory 78 and shown in FIG. 12, and determines a target concentration based on the detected ambient temperature (Step S75). Since nothing is known about the circumstances in which the fuel cell system 10 is started next time, the target concentration is determined based on the determined ambient temperature, on the assumption that the ambient temperature in the next startup will be the same as the current ambient temperature.

Next, if the concentration sensor 66 successfully detects the concentration of methanol aqueous solution S (Step S77: YES), the concentration of the methanol aqueous solution S is determined (Step S79).

On the other hand, if the concentration of methanol aqueous solution S is not detected successfully (Step S77: NO), the system reads final concentration data which indicates the final concentration of methanol aqueous solution S and the corresponding time data from the memory 78. The system then checks if this final concentration data is valid or not (Step S81). Whether or not the final concentration data is valid is determined by checking if a predetermined period of time (e.g., six months) has passed since the concentration sensor 66 detected the final concentration represented by this particular final concentration data. So this can be determined on the basis of time data. If the predetermined period of time has not passed, the data is determined to be valid whereas it is determined to be invalid if the predetermined period of time has passed.

If the final concentration data is valid, Step S79 sets the final concentration indicated by this particular final concentration data as the concentration of aqueous solution, and the amount of input of methanol fuel F is determined based on the determined concentration and the target concentration (Step S83), and the fuel pump 20 is operated to input the determined amount of methanol fuel F to the methanol aqueous solution S (Step S85). If the answer in Step S77 is YES, then the concentration data which indicates the detected concentration, and corresponding time data are written in the memory 78 (Step S87), and the system shuts down (Step S89).

On the other hand, if Step S81 determines that the final concentration data is invalid, no methanol fuel F is inputted, nor is concentration data stored into the memory 78, and the process goes to Step S89.

As has been described, when shutting down the power generation, the concentration of the aqueous solution necessary for the next system startup is calculated roughly, methanol fuel F is inputted, and the system shuts down.

Figure 9:
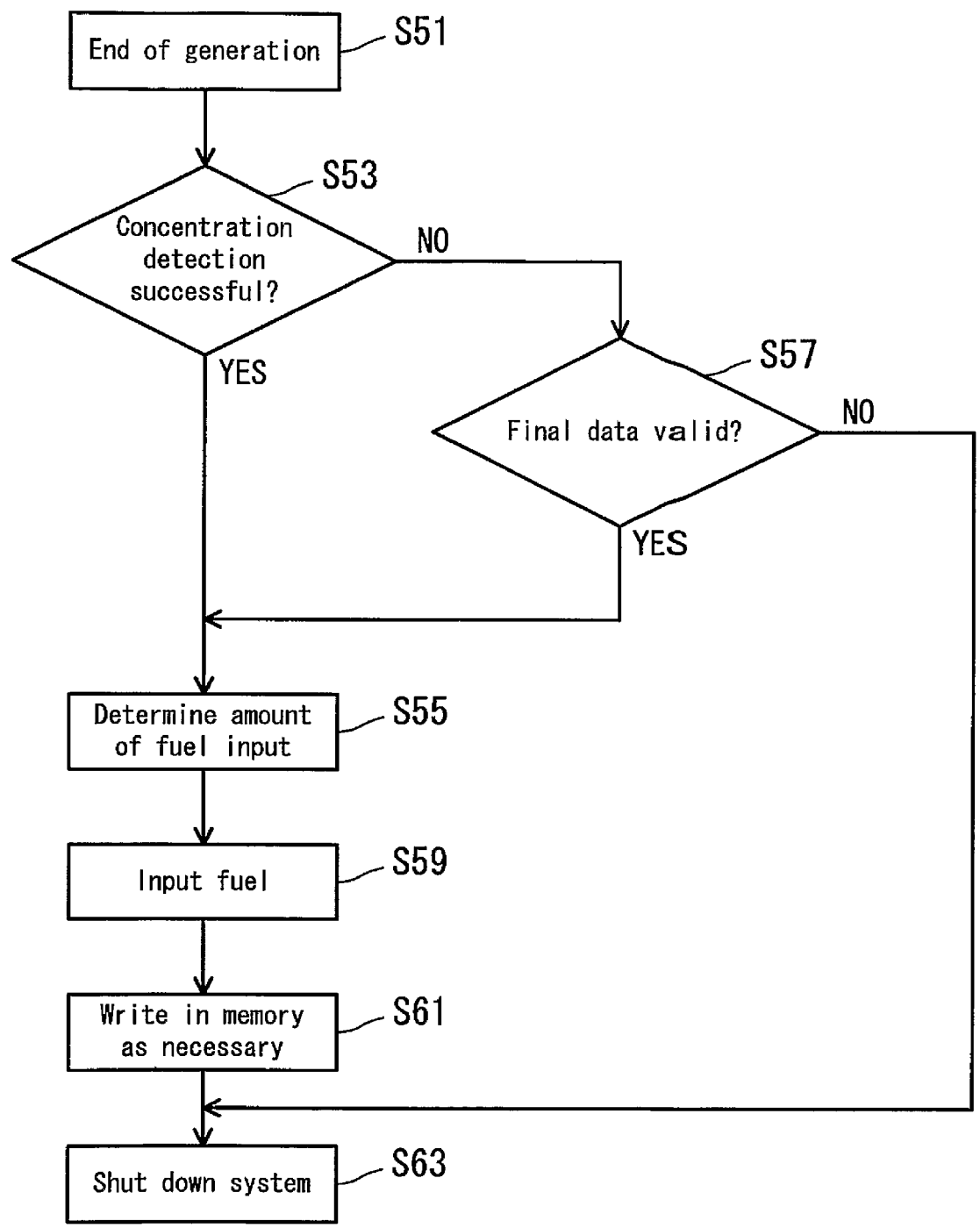
FIG. 9 is a flowchart which shows an example of shutdown operation of the power generation according to a preferred embodiment of the present invention.
Figure 11:
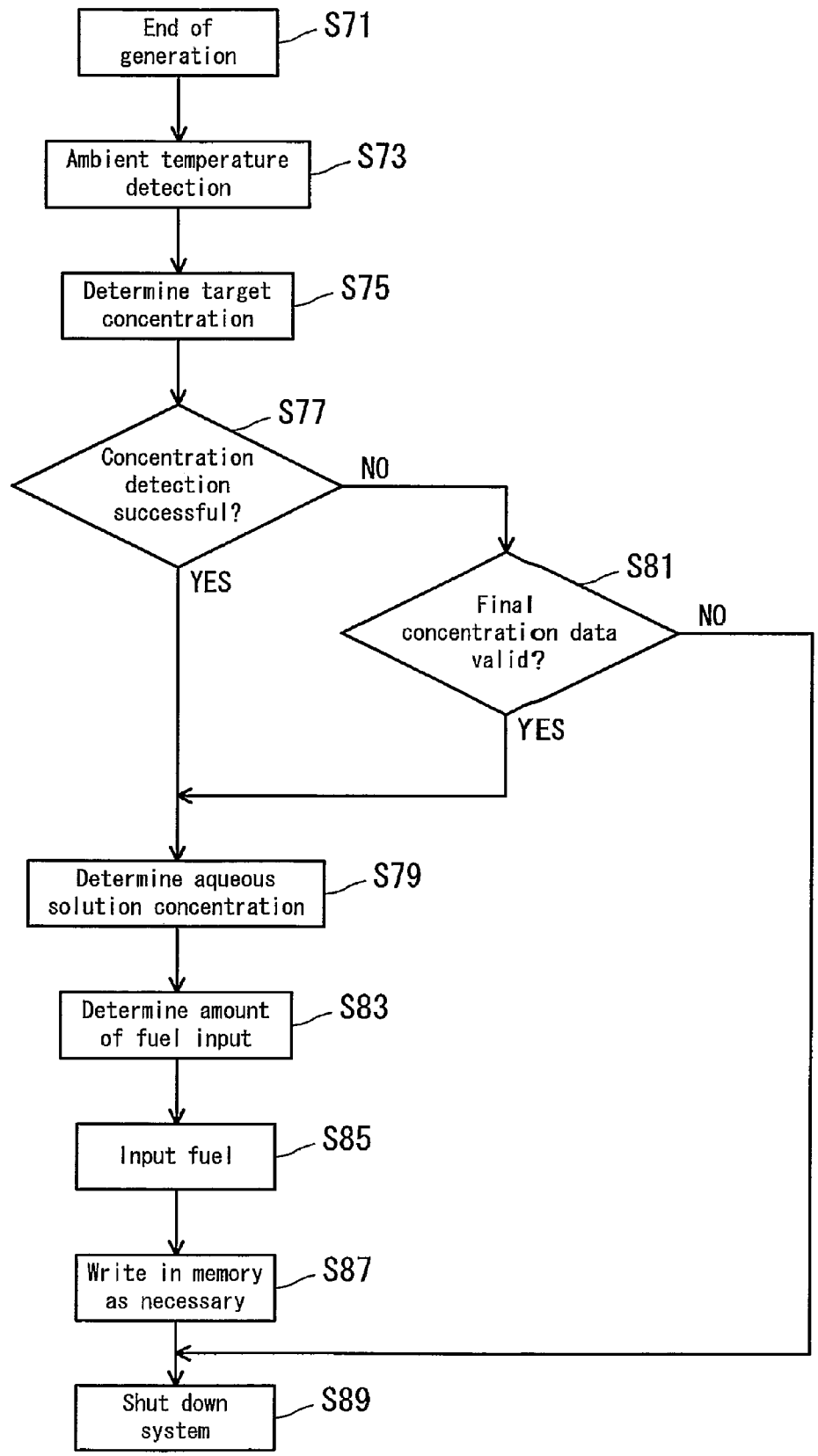
FIG. 11 is a flowchart which shows another shutdown operation example according to a preferred embodiment of the present invention.

Execution of the process shown in FIG. 11 also provides the same benefits as proved by execution of the process shown in FIG. 9.

Further, description will be made for a fuel cell system 10 according to another preferred embodiment of the present invention.

Figure 14:
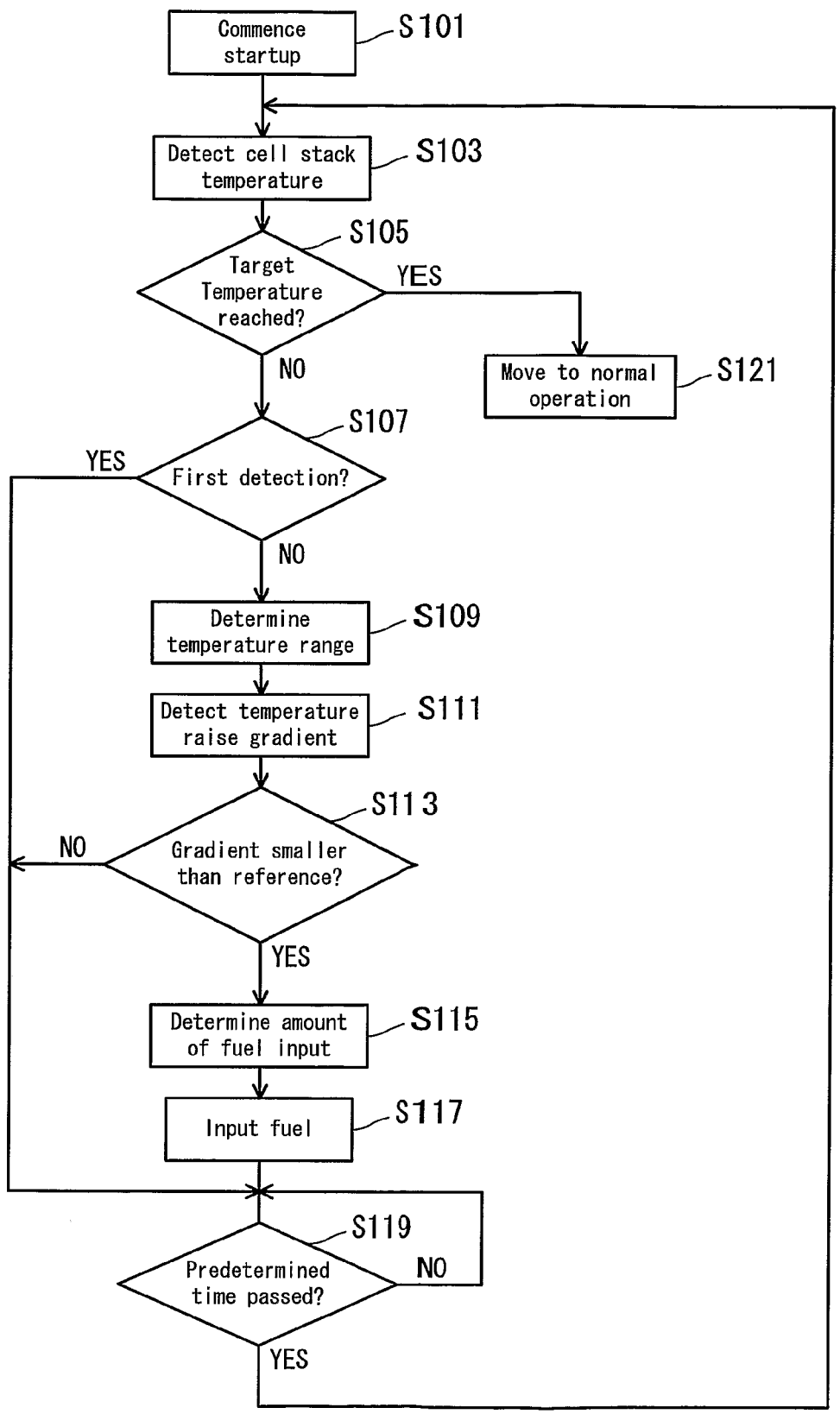
FIG. 14 is a flowchart which shows an example of operation of a preferred embodiment of the present invention.
Figure 16:
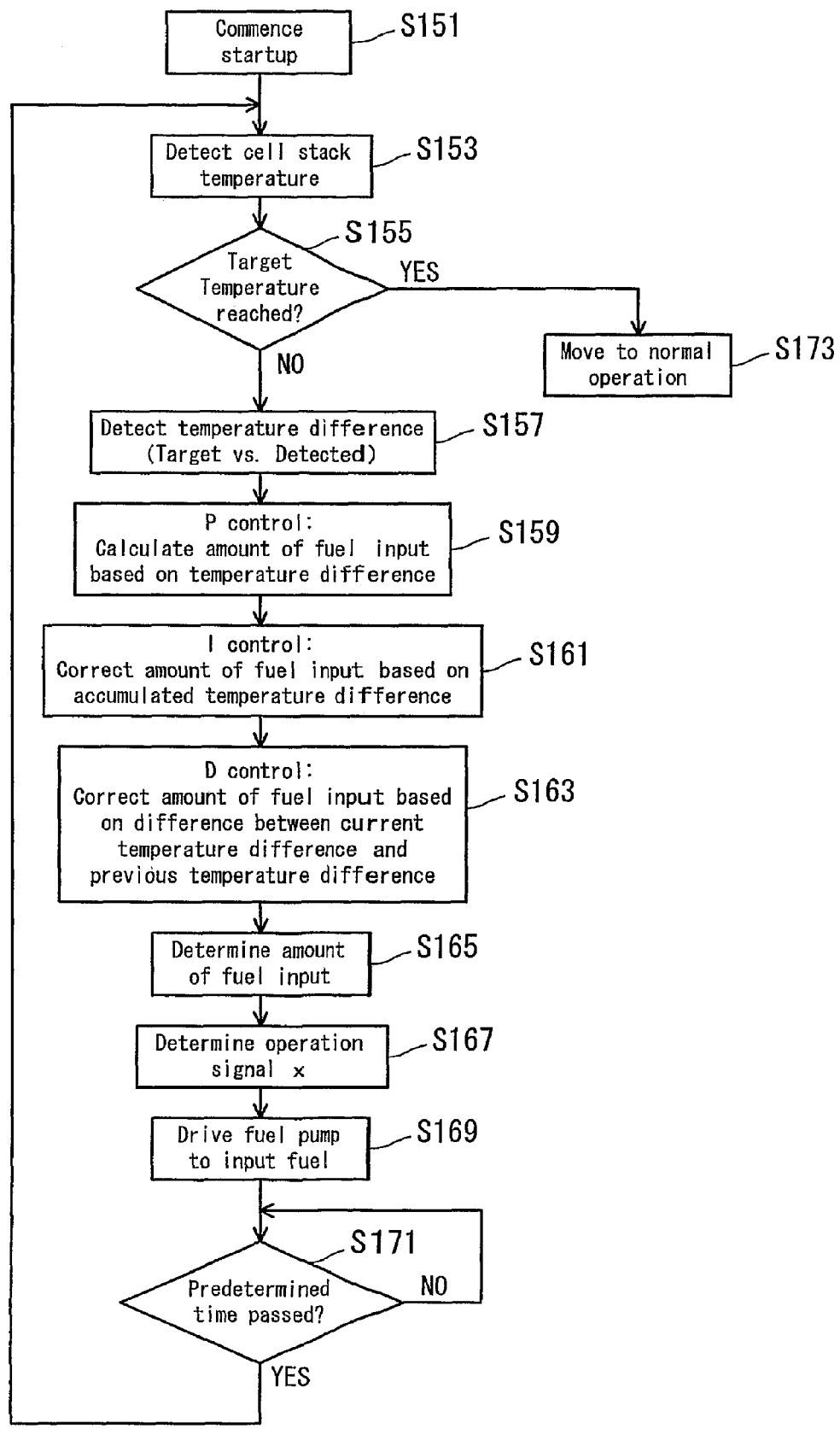
FIG. 16 is a flowchart which shows an example of operation of another preferred embodiment of the present invention.

In the present preferred embodiment, the memory 78 stores: table data as shown in FIG. 13 which relates to temperature ranges of the fuel cell stack 12, and a temperature raise reference gradient and an amount of fuel input for each temperature range. Further, programs, etc. for execution of operations as shown in FIG. 14 and FIG. 16 are stored. According to the table data shown in FIG. 13, the temperature raise reference gradient and the amount of input of methanol fuel F are set gradually smaller as the temperature range approaches the target temperature (for example, approximately 65° C. in this preferred embodiment). It should be noted here that the table data shown in FIG. 13 is an example when about 2.5 liters of methanol aqueous solution S are stored in the aqueous solution tank 18 which has a capacity of 3 liters.

In the present preferred embodiment, the input amount determining device preferably includes a CPU 70 and a memory 74. The CPU 70 serves also as the detector which detects the temperature raise gradient and as the determining device which determines the amount of input of methanol fuel F. The input device includes the fuel supply pipe 16 and the fuel pump 20.

Description will be made for an example of a system startup operation of the fuel cell system 10 according to the present preferred embodiment.

Referring to FIG. 14, first, a startup operation of the fuel cell system 10 is commenced (Step S101), which enables various components such as the pumps and the cooling fan.

Then, the temperature sensor 68 detects the temperature of the fuel cell stack 12 (Step S103), and then the system checks if the detected temperature has reached a target temperature (for example, approximately 65° C. in this preferred embodiment) (Step S105). If the target temperature has not been reached, the system checks if the temperature detection was the first-time detection (Step S107). If the temperature detection is not the first-time detection, the system determines to which of the temperature ranges in the table data shown in FIG. 13 the temperature of the fuel cell stack 12 belongs (Step S109). Then, the system detects a temperature raise gradient, i.e. a temperature increase per unit time, based on a temperature which was detected previously and the temperature which was detected this time (Step S111). The system then checks, with reference to table data shown in FIG. 13, if the detected temperature raise gradient is smaller than the corresponding temperature raise reference gradient (in the same temperature range) (Step S113).

If the temperature raise gradient is smaller than the temperature raise reference gradient, the system determines that the temperature increase is slow due to a low concentration of the methanol aqueous solution S, and makes reference to table data shown in FIG. 13 to select the corresponding amount of fuel input (in the same temperature range) as the amount of input of methanol fuel F (Step S115). Then the fuel pump 20 is operated to input the determined amount of methanol fuel F to methanol aqueous solution S in the aqueous solution tank 18 (Step S 117). This increases the concentration of the methanol aqueous solution S, and accelerates the temperature raising speed. Then, the system waits until a predetermined period of time (e.g. 30 seconds) has passed since the temperature detection (Step S119). Upon lapse of the predetermined period of time, the process goes back to Step S103, to detect the temperature of the fuel cell stack 12 again.

On the other hand, if Step S113 finds that the temperature raise gradient is not smaller than the temperature raise reference gradient, the system determines that there is no problem in the concentration of the methanol aqueous solution S. Thus, no methanol fuel F is inputted or the current status is kept. The process moves on to Step S119, where the system waits for the next temperature detection. If Step S107 finds that the temperature detection was the first-time detection, the process does not go to Step S109, but to Step S119. Thus, the temperature of the fuel cell stack 12 is detected at a predetermined interval.

The above-described cycle is repeated until Step S105 determines that the temperature of the fuel cell stack 12 has reached the target temperature. Once Step S105 determines that the temperature of the fuel cell stack 12 has reached the target temperature, the process switches to a normal operation mode (Step S121).

The fuel cell system 10 as described above appropriately sets the amount of methanol fuel F to be inputted to the methanol aqueous solution S at system startup, without detecting the concentration of methanol aqueous solution S but by detecting the temperature of the fuel cell stack 12. This makes possible to easily set the concentration of the methanol aqueous solution S at a system startup to a preferred concentration. Therefore, it is possible to increase the temperature of the fuel cell stack 12 to a target temperature within a short time upon start-up, without decreasing utilization efficiency of the methanol fuel F.

Also, by making reference to table data in the memory 78, it is possible to easily determine whether or not to input the methanol fuel F, and how much to input, which makes it possible to increase the temperature of the fuel cell stack 12 to the target temperature along the reference gradient.

In the above-described preferred embodiment, the amount of fuel input is preferably determined based on the temperature raise gradient, but the present invention is not limited by this. For example, a table which relates temperature difference per unit time in the fuel cell stack 12 to the amount of fuel input may be used. In this case, the temperature sensor 68 detects the temperature of the fuel cell stack 12 at a predetermined time interval, and the CPU 74 obtains a temperature difference per the predetermined time based on the detected temperatures, and determines the amount of input of fuel which corresponds to the temperature difference based on the table. In this case again, it is simple to determine the amount of input of methanol fuel F.

Next, a fuel cell system 10 according to another preferred embodiment of the present invention will be described.

Referring to FIG. 15, in the present preferred embodiment, the CPU 74 calculates an operation signal x which indicates an operation time for the fuel pump 20 to input a necessary amount of methanol fuel F. The signal calculation is made by PID (Proportional Integration Differentiation) control and based upon the temperature difference between the target temperature and the detected temperature of the fuel cell stack 12. The operation signal x is given to the fuel pump 20 to operate the fuel pump 20, whereby methanol fuel F is inputted to the aqueous solution tank 18. Thereafter, the temperature of the fuel cell stack 12 is detected, and the temperature is fed back.

In the PID control, the operation signal x is obtained by using Equation 1:

Control calculation $$x = Kp \times \text{temperature difference} + Ki \times \text{temperature difference accumulation} + Kd \times \text{difference from the previous temperature difference},$$ [Equation 1]

where

"$Kp \times$ temperature difference" represents "Proportion member",

"$Ki \times$ temperature difference accumulation" represents "Integration member", and "$Kd \times$ difference from the previous temperature difference" represents "Differentiation member", whereas $Kp$, $Ki$, $Kd$ represent constants.

The proportion member, integration member and differentiation member shown in Equation 1 are obtained by P(proportion) control, I(Integration) control and D (differentiation) control respectively, and the operation signal x is calculated based on temperature difference.

In the present preferred embodiment, the input amount determining device preferably includes the CPU 74.

Description will be made for an operation of the fuel cell system 10 used in the above-mentioned PID control, with reference to FIG. 16.

Referring to FIG. 16, first, a startup operation of the fuel cell system 10 is commenced (Step S151), which activates various components such as the pumps and the cooling fan.

Then, the temperature sensor 68 detects the temperature of the fuel cell stack 12 (Step S153), and then the system checks if the detected temperature has reached a target temperature (for example, approximately 65° C. in this preferred embodiment) (Step S155). If the target temperature has not been reached, a temperature difference (the difference between the target temperature and the detected temperature of the fuel cell stack 12) is detected (Step S157), and the amount of input of methanol fuel F is calculated by the P control based on the temperature difference (Step S159).

Specifically, a quantity of heat necessary to raise the temperature of the fuel cell stack 12 by about 1° C. is calculated in advance and stored in the memory 78, taking into account the thermal capacity of the fuel cell stack itself, the amount of heat generation from crossover methanol, the thermal capacity of methanol aqueous solution S, the amount of heat due to power generation, and the thermal capacity loss caused by the cooling fans 28, 46 and air etc. The quantity of heat necessary for raising the temperature of the fuel cell stack 12 to a target temperature is proportional to the difference between the target temperature and the temperature of the fuel cell stack 12. Thus, by multiplying the quantity of heat necessary to raise the temperature of the fuel cell stack 12 by about 1° C. with the temperature difference, the quantity of heat necessary to raise the temperature of fuel cell stack 12 by the temperature difference is obtained. Once the quantity of heat necessary to raise the temperature of fuel cell stack 12 by the temperature difference has been obtained, the amount of input of methanol fuel F which is necessary to obtain that particular quantity of heat is calculated.

Next, the I control is performed to correct the amount of input of methanol fuel F, based on the accumulated value of the temperature differences (Step S161). Generally, a target temperature is not achieved by the P control alone because of residual deviation (a slight temperature difference). In order to cancel this deviation, the I control is used. Specifically, the residual deviation is accumulated over time, and once a certain amount has been reached, the amount of input is increased to cancel the deviation (temperature difference).

Further, the D control is used to correct the amount of input of methanol fuel F, based on the difference between the current temperature difference and the previous temperature difference (Step S163). Although the PI control is able to bring the temperature of the fuel cell stack 12 to the target temperature, the D control is used in order to increase control response. In the D control, the amount of input of methanol fuel F is further corrected when there is a difference between the current deviation and the previous deviation.

Through the above-described process, the amount of input of methanol fuel F is determined (Step S165), an operation time of the fuel pump 20 necessary for supplying that amount of methanol fuel F to methanol aqueous solution S is calculated, and an operation signal x which indicates the calculated operation time is determined (Step S167). Then, the operation signal x is supplied to the fuel pump 20 to operate the fuel pump 20, thereby supplying the necessary amount of methanol fuel F to the aqueous solution tank 18 (Step S169). Thereafter, the system waits until a predetermined period of time (e.g., about 10 seconds) has passed since the temperature detection (Step S171). Upon lapse of the predetermined period of time, the process goes back to Step S153, to detect the temperature of the fuel cell stack 12 again.

It should be noted that Steps S159-S167 in FIG. 16 represent the calculation of Equation 1.

The above-described cycle is repeated until Step S155 determines that the temperature of the fuel cell stack 12 has reached the target temperature. Once Step S155 determines that the temperature of the fuel cell stack 12 has reached the target temperature, the process moves to a normal operation mode (Step S173).

According to the fuel cell system 10 which operates as described above, an optimum amount of input of methanol fuel F is determined by a PID control based on the difference between the target temperature and the temperature of the fuel cell stack 12. The temperature of the fuel cell stack 12 reaches the target temperature within a short time simply by inputting the amount of methanol fuel F determined by the PID control. Further, since the temperature of the fuel cell stack 12 can be detected easily, it is easy to perform a PID control.

Figure 17:
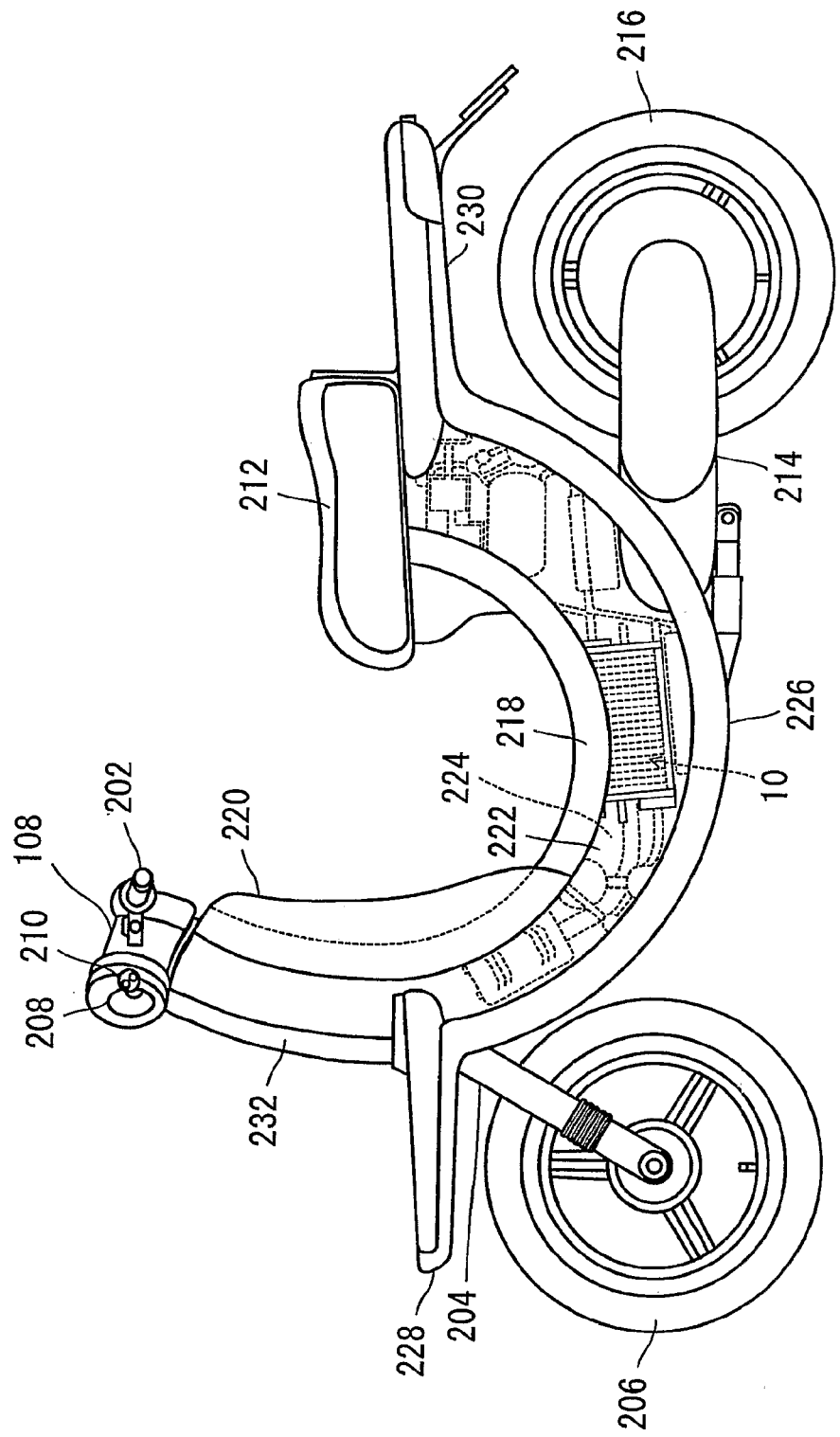
FIG. 17 is a side view of a motorcycle which incorporates the fuel cell system according to a preferred embodiment of the present invention.

The fuel cell systems 10 which have been described above can be suitably utilized for a motorcycle 200 as shown in FIG. 17.

The motorcycle 200 includes an unillustrated steering shaft which has an upper end to which a handle 202 is attached. The steering shaft has a lower portion to which a right-and-left pair of front forks 204 is provided. A front wheel 206 is rotatably supported at each lower end of the front forks 204. The handle 202 has a center region where a meter 108 is disposed. Ahead of the meter 108 is a headlamp 208 and on both sides thereof are flasher lamps 210.

In the motorcycle 200, an unillustrated, upwardly-opening arc-shaped vehicle frame is arranged to extend from below to the rear of the handle 202. A seat (rider's seat) 212 is disposed above a rear end of the frame. The vehicle frame supports a front end portion of a rear arm 214, and the rear arm 214 has a rear end which is pivotable in up and down directions. At a rear end portion of the rear arm 214, a rear wheel 216 which is preferably a driving wheel is rotatably supported on a shaft.

In the motorcycle 200, a fuel cell system 10 is disposed in the vehicle frame along the arc. In the rear arm 214, a control circuit 72, an electric motor and a drive mechanism (neither is illustrated) are provided. Electric energy generated in the fuel cell stack 12 is supplied to the electric motor according to commands from the control circuit 72 to turn the electric motor. The drive mechanism transmits rotational power of the electric motor to a rear wheel 216 thereby drives the motorcycle 200.

The fuel cell system 10 is covered by an upper cover 218 from above and to near the handle 202. At front portion of the upper cover 218, leg shields (fenders) 220 which protect the rider's legs are attached.

A left cover 222 and a right cover 224 are arranged to extend from respective side end surfaces of the upper cover 218. Both of the left cover 222 and the right cover 224 are made of a transparent member so that the fuel cell system 10 can be viewed.

The transparent left cover 222 and right cover 224 are connected by a lower cover 226. The lower cover 226 has a cutout to allow the rear arm 214 to protrude.

The lower cover 226 has a front end portion which extends above a front wheel 206 and serves as a front carrier 228. Also, the lower cover 226 has a rear end portion which extends above a rear wheel 216 and serves as a rear carrier 230. Further, a front cover 232 extends from the front carrier 228 to the headlamp 208. The front cover 232 is connected with both of the left cover 222 and the right cover 224.

In the above-described preferred embodiment, table data stored in the memory 78 is like the one shown in FIG. 3. In this example, a fuel cell stack temperature which has been detected is classified into a temperature range, and each range is given a corresponding target concentration. The present invention is not limited, however, by this. For example, the corresponding target concentration may be prepared for each fuel cell stack temperature which is detected. This applies to other table data shown in FIG. 4 through FIG. 6, FIG. 10 and FIG. 12. Likewise, as for the table data shown in FIG. 13, the temperature raise reference gradient and the amount of fuel input may be provided for each fuel cell stack temperature detected.

The fuel cell system 10 can be used not only for motorcycles but also for automobiles, marine vessels and any type of transport equipment or vehicle.

The fuel to be used is not limited to methanol. The present invention is applicable to fuel cell systems which use alcohol fuel such as ethanol.

Further, the feedback control may be provided by PI control.

The present invention being thus far described and illustrated in detail, it is obvious that these descriptions and drawings only represent an example of various preferred embodiments of the present invention, and should not be interpreted as limiting the invention. The spirit and scope of the present invention is only limited by words used in the accompanied claims.

What is claimed is:

1. A fuel cell system comprising:
a fuel cell stack which is supplied with a fuel aqueous solution and generates electric energy by electro-chemical reaction;
a concentration detector arranged to detect a concentration of the fuel aqueous solution to be supplied to the fuel cell stack;
a temperature detector arranged to detect a temperature of the fuel cell stack;
a central processing unit programmed to control the fuel cell system;
a memory arranged to store data including a first correspondence data which indicates a correspondence between the temperature of the fuel cell stack and a target concentration of the fuel aqueous solution;
the central processing unit and the memory together defining an input amount determining device programmed to determine an amount of fuel to be inputted to the fuel aqueous solution based on the concentration of the fuel aqueous solution detected by the concentration detector and the temperature of the fuel cell stack detected by the temperature detector; and
an input device arranged to input the determined amount of the fuel to the fuel aqueous solution; wherein
the central processing unit further includes:
a target concentration determining device programmed to determine a target concentration of the fuel aqueous solution by making reference to the first correspondence data in the memory and based on the temperature of the fuel cell stack detected by the temperature detector;
an input fuel amount determining device programmed to determine an amount of fuel to be input based on the concentration of the fuel aqueous solution detected by the concentration detector and the target concentration determined by the target concentration determining device; and
a target temperature raise time setting device programmed to set a target temperature raise time which indicates a time that is necessary for increasing the fuel cell stack to a predetermined temperature; wherein the data in the memory further includes a second correspondence data which indicates a correspondence between the temperature of the fuel cell stack, the target temperature raise time, and the target concentration; and the target concentration determining device determines the target concentration of the fuel aqueous solution by making reference to the second correspondence data and based on the temperature of the fuel cell stack detected by the temperature detector and the target temperature raise time set by the target temperature raise time setting device.

2. The fuel cell system according to claim 1, further comprising an ambient temperature detector arranged to detect an ambient temperature, wherein the input amount determining device corrects the determined amount of input of the fuel based on a difference between the temperature of the fuel cell stack and the ambient temperature.

3. The fuel cell system according to claim 1, wherein the memory stores historical information about the concentration of the fuel aqueous solution, the concentration of the fuel aqueous solution being obtained from the historical information upon failure in detecting the concentration of the fuel aqueous solution by the concentration detector.

4. The fuel cell system according to claim 3, wherein the historical information includes power generation data which indicates whether or not power generation was successful in the previous system startup, final concentration data which indicates a final concentration of the fuel aqueous solution detected by the concentration detector, and time data which indicates the time when the final concentration was detected by the concentration detector, the concentration of the fuel aqueous solution being provided by the final concentration indicated by the final concentration data upon determination, based on the power generation data, that power generation was successful in the previous system startup, and determination, based on the time data, that a first predetermined time has not been lapsed since the detection of the final concentration.

5. The fuel cell system according to claim 4, wherein the historical information further includes input information of the fuel, the amount of input of the fuel being determined based on the input information upon determination, based on the power generation data, that power generation was not successful in the previous system startup or determination, based on the time data, that the first predetermined time has been lapsed since the detection of the final concentration.

6. The fuel cell system according to claim 5, wherein the amount of input of the fuel is provided by the predetermined amount upon determination, based on the input information, that a second predetermined time has passed since the previous input of the fuel, the amount of input of the fuel is zero upon determination, based on the input information, that the second predetermined time has not passed since the previous input of the fuel.

7. A transport equipment comprising the fuel cell system according to claim 1.

8. A fuel cell system comprising:
a fuel cell stack which is supplied with a fuel aqueous solution and generates electric energy by electro-chemical reaction;
a concentration detector arranged to detect a concentration of the fuel aqueous solution to be supplied to the fuel cell stack;
a temperature detector arranged to detect a temperature of the fuel cell stack;
a central processing unit programmed to control the fuel cell system;
a memory arranged to store data including a first correspondence data which indicates a correspondence between the temperature of the fuel cell stack and a target concentration of the fuel aqueous solution;
the central processing unit and the memory together defining an input amount determining device programmed to determine an amount of fuel to be inputted to the fuel aqueous solution based on the concentration of the fuel aqueous solution detected by the concentration detector and the temperature of the fuel cell stack detected by the temperature detector;
an input device arranged to input the determined amount of the fuel to the fuel aqueous solution; and
a secondary battery electrically connected with the fuel cell stack, and an electric-charge detector arranged to detect an amount of electric charge in the secondary battery; wherein
the central processing unit further includes:
a target concentration determining device programmed to determine a target concentration of the fuel aqueous solution by making reference to the first correspondence data in the memory and based on the temperature of the fuel cell stack detected by the temperature detector; and
an input fuel amount determining device programmed to determine an amount of fuel to be input based on the concentration of the fuel aqueous solution detected by the concentration detector and the target concentration determined by the target concentration determining device; wherein
the data in the memory includes a second correspondence data which indicates a correspondence between the temperature of the fuel cell stack, the amount of electric charge in the secondary battery, and the target concentration; and
the target concentration determining device determines the target concentration of the fuel aqueous solution by making reference to the second correspondence data and based on the temperature of the fuel cell stack detected by the temperature detector and the amount of electric charge in the secondary battery detected by the electric-charge detector.

9. The fuel cell system according to claim 8, further comprising an ambient temperature detector arranged to detect an ambient temperature, wherein the input amount determining device corrects the determined amount of input of the fuel based on a difference between the temperature of the fuel cell stack and the ambient temperature.

10. The fuel cell system according to claim 8, wherein the memory stores historical information about the concentration of the fuel aqueous solution, the concentration of the fuel aqueous solution being obtained from the historical information upon failure in detecting the concentration of the fuel aqueous solution by the concentration detector.

11. The fuel cell system according to claim 10, wherein the historical information includes power generation data which indicates whether or not power generation was successful in the previous system startup, final concentration data which indicates a final concentration of the fuel aqueous solution detected by the concentration detector, and time data which indicates the time when the final concentration was detected by the concentration detector, the concentration of the fuel aqueous solution being provided by the final concentration indicated by the final concentration data upon determination, based on the power generation data, that power generation was successful in the previous system startup, and determination, based on the time data, that a first predetermined time has not been lapsed since the detection of the final concentration.

12. The fuel cell system according to claim 11, wherein the historical information further includes input information of the fuel, the amount of input of the fuel being determined based on the input information upon determination, based on the power generation data, that power generation was not successful in the previous system startup or determination, based on the time data, that the first predetermined time has been lapsed since the detection of the final concentration.

13. The fuel cell system according to claim 12, wherein the amount of input of the fuel is provided by the predetermined amount upon determination, based on the input information, that a second predetermined time has passed since the previous input of the fuel, the amount of input of the fuel is zero upon determination, based on the input information, that the second predetermined time has not passed since the previous input of the fuel.

14. A transport equipment comprising the fuel cell system according to claim 8.

* * * * *